United States Patent
Kuhara

(10) Patent No.: US 10,684,619 B2
(45) Date of Patent: Jun. 16, 2020

(54) NOTIFICATION METHOD, NOTIFICATION DEVICE, AND TERMINAL

(71) Applicant: Panasonic Intellectual Property Corporation of America, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 308 days.

(21) Appl. No.: 15/891,450

(22) Filed: Feb. 8, 2018

(65) Prior Publication Data

US 2018/0164807 A1    Jun. 14, 2018

Related U.S. Application Data

(63) Continuation of application No. PCT/JP2016/003250, filed on Jul. 8, 2016.

(Continued)

(30) Foreign Application Priority Data

Feb. 5, 2016  (JP) ................................ 2016-020721
Jun. 21, 2016  (JP) ................................ 2016-122412

(51) Int. Cl.
   *G05D 1/00*   (2006.01)
   *G01S 5/00*   (2006.01)
   (Continued)

(52) U.S. Cl.
   CPC .............. *G05D 1/0033* (2013.01); *G01S 5/00* (2013.01); *G01S 5/009* (2013.01); *G05D 1/0044* (2013.01);
   (Continued)

(58) Field of Classification Search
   CPC .... G05D 1/0033; G05D 1/106; G05D 1/0044; G05D 1/0016; G05D 1/0022; G01S 5/00;
   (Continued)

(56) References Cited

U.S. PATENT DOCUMENTS 3,742,495 A * 6/1973 Diamantides ......... G01S 5/0009
                                                    342/64
8,717,169 B2 * 5/2014 Rodger .................. G08B 21/06
                                                    340/540

(Continued)

FOREIGN PATENT DOCUMENTS

JP         63-302694       12/1988

OTHER PUBLICATIONS

International Search Report of PCT application No. PCT/JP2016/003250 dated Oct. 4, 2016.

*Primary Examiner* — Nicholas Kiswanto
(74) *Attorney, Agent, or Firm* — Greenblum & Bernstein, P.L.C.

(57) ABSTRACT

A notification method includes determining, on the basis of positional information regarding a drone and positional information regarding a plurality of terminals carried by an operator who visually observes and operates the drone and one or more visual observers who visually observe the drone, at least either responsible observation areas, which are areas in which the operator and the one or more visual observers are to visually observe the drone, or responsible observation periods, which are periods for which the operator and the one or more visual observers are to visually observe the drone, and notifying the plurality of terminals of at least either the responsible observation areas or the responsible observation periods.

13 Claims, 19 Drawing Sheets

Related U.S. Application Data

(60) Provisional application No. 62/214,420, filed on Sep. 4, 2015.

(51) Int. Cl.

| | | |
|---|---|---|
| *H04M 11/00* | (2006.01) | |
| *G08C 17/02* | (2006.01) | |
| *G05D 1/10* | (2006.01) | |
| *G08G 5/00* | (2006.01) | |
| *H04Q 9/00* | (2006.01) | |
| *B64C 39/02* | (2006.01) | |

(52) U.S. Cl.
CPC .............. *G05D 1/106* (2019.05); *G08C 17/02* (2013.01); *G08G 5/0013* (2013.01); *G08G 5/0034* (2013.01); *G08G 5/0069* (2013.01); *G08G 5/0082* (2013.01); *H04M 11/00* (2013.01); *B64C 39/024* (2013.01); *B64C 2201/146* (2013.01); *G05D 1/0016* (2013.01); *G05D 1/0022* (2013.01); *H04Q 9/00* (2013.01)

(58) Field of Classification Search
CPC ...... G01S 5/009; G08C 17/02; G08G 5/0013; G08G 5/0034; G08G 5/0069; G08G 5/0082; H04M 11/00; B64C 39/024; B64C 2201/146; H04Q 9/00

See application file for complete search history.

(56) References Cited

U.S. PATENT DOCUMENTS

| | | | |
|---|---|---|---|
| 9,310,477 B1* | 4/2016 | Sampigethaya | G01S 13/91 |
| 9,555,897 B2* | 1/2017 | Eline | B64C 39/024 |
| 9,588,516 B1* | 3/2017 | Gurel | G05D 1/0033 |
| 9,595,198 B2* | 3/2017 | Limbaugh | G08G 5/0069 |
| 9,671,791 B1* | 6/2017 | Paczan | B64C 39/024 |
| 9,734,723 B1* | 8/2017 | Bruno | G08G 5/0039 |
| 9,741,255 B1* | 8/2017 | Navot | G08G 5/0082 |
| 9,821,910 B1* | 11/2017 | Suiter | B64C 39/024 |
| 9,875,454 B2* | 1/2018 | Kantor | G08G 5/0013 |
| 9,886,863 B2* | 2/2018 | Kuhara | B64C 13/18 |
| 9,933,780 B2* | 4/2018 | Chau | G05D 1/0088 |
| 9,953,540 B2* | 4/2018 | Macfarlane | G01C 21/20 |
| 10,319,243 B2* | 6/2019 | Kreiner | G08G 5/0043 |
| 10,325,506 B2* | 6/2019 | Goddemeier | G08G 5/0013 |
| 10,446,042 B2* | 10/2019 | Uesugi | B64F 1/222 |
| 2016/0117933 A1* | 4/2016 | Chan | G08G 5/0069 |
| | | | 705/317 |
| 2017/0032587 A1* | 2/2017 | Cheatham | G06Q 10/0833 |
| 2017/0069214 A1* | 3/2017 | Dupray | G08G 5/0021 |
| 2018/0061243 A1* | 3/2018 | Shloosh | G08G 5/0065 |
| 2019/0018407 A1* | 1/2019 | Inui | H04W 28/26 |
| 2019/0019418 A1* | 1/2019 | Tantardini | G01S 7/003 |
| 2019/0235489 A1* | 8/2019 | Cantrell | G05D 1/101 |

\* cited by examiner

| RESPONSIBLE OBSERVER | TIME PERIOD |
|---|---|
| OPERATOR | 13:00 - 13:10 |
| FIRST VO | 13:10 - 13:20 |
| ★ SECOND VO | 13:20 - 13:30 |
| THIRD VO | 13:30 - 13:40 |
| OPERATOR | 13:40 - 13:50 |

506

NOTIFICATION METHOD, NOTIFICATION DEVICE, AND TERMINAL

BACKGROUND

1. Technical Field

The present disclosure relates to a notification method, a notification device, and a terminal used for notification of a timing at which a drone is to be visually observed.

2. Description of the Related Art

During these years, small drones remotely controlled by remote controllers are coming into wide use. Such a drone includes a plurality of propellers and can freely fly through the air by controlling rotation speeds of the plurality of propellers.

Since drones can freely fly through the air, various regulations on the flight of drones are being examined. For example, a regulation that permits the flight of a drone only within an area in which an operator can visually observe the drone is being examined.

Japanese Unexamined Patent Application Publication No. 63-302694 discloses a telescopic wireless control device with which an operator can visually observe and operate a radio-controlled airplane at the same time using his/her hands.

In the technique disclosed in Japanese Unexamined Patent Application Publication No. 63-302694, however, a radio-controlled airplane can fly only within an area in which an operator can visually observe the radio-controlled airplane, and it is difficult to fly the radio-controlled airplane outside the area.

A regulation, therefore, is being examined that, if visual observers (VOs) who visually observe a drone along with an operator are deployed, for example, permits the flight of a drone within areas in which the operator or one of the VOs can visually observe the drone.

SUMMARY

The technique disclosed in the example of the related art, however, requires further improvements.

In one general aspect, the techniques disclosed here feature a notification method of a timing at which a drone is to be visually observed including obtaining, at a notification device having a processor and a memory, drone positional information transmitted from the drone to the notification device, obtaining, at the notification device, remote terminal positional information transmitted from a plurality of remote terminals to the notification device, each terminal of the plurality of remote terminals to be held by an operator who visually observes and operates the drone and one or more visual observers who visually observe the drone, determining, by the notification device, on the basis of the drone positional information and the remote terminal positional information, at least either responsible observation areas, which are areas in which the operator and the one or more visual observers are to visually observe the drone, or responsible observation periods, which are periods for which the operator and the one or more visual observers are to visually observe the drone, and notifying the plurality of remote terminals of at least either the responsible observation areas or the responsible observation periods determined in the determining, by transmitting data corresponding to the at least either the responsible observation areas or the responsible observation periods.

According to the aspect of the present disclosure, since the plurality of terminals are notified of at least either the responsible observation areas, which are areas in which the operator and the one or more visual observers are to visually observe the drone, or the responsible observation periods, for which the operator or the one or more visual observers are to visually observe the drone, the operator and the one or more visual observers can understand when to visually observe the drone.

It should be noted that this general or specific aspect may be implemented as a device, a system, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
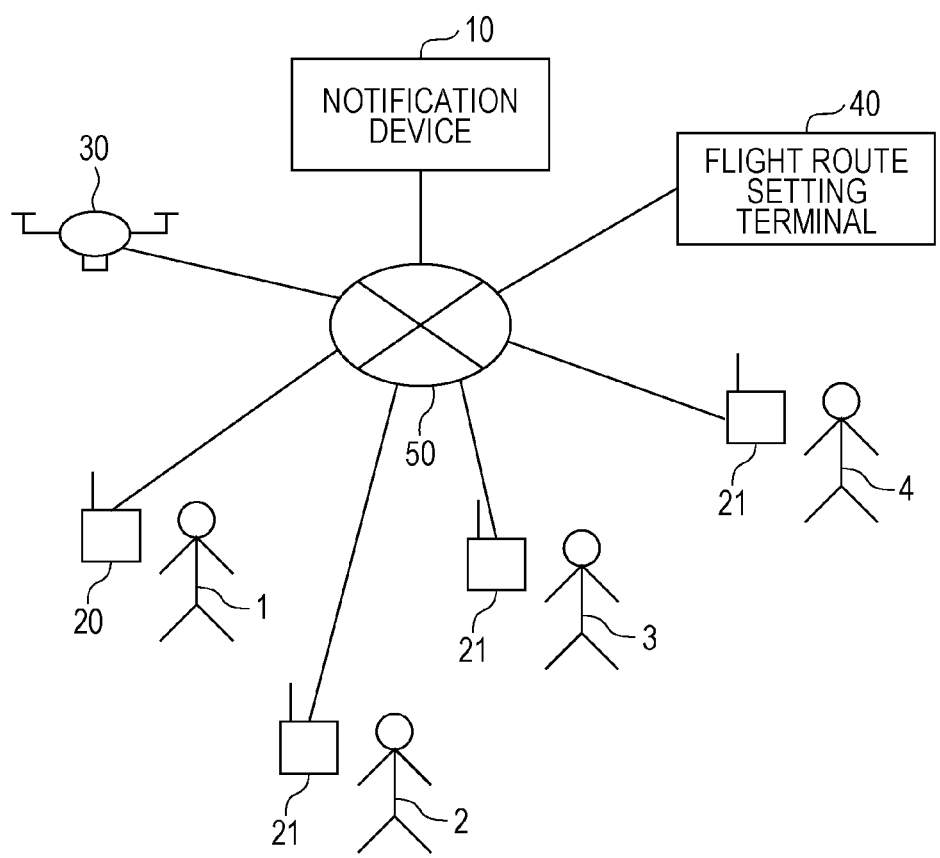
FIG. 1 is a diagram illustrating the configuration of a flight control system according to a first embodiment of the present disclosure.

Underlying Knowledge Forming Basis of Present Disclosure

Since drones can freely fly through the air, various regulations on the flight of drones are being examined. For example, a regulation is being examined that, if VOs who visually observe a drone along with an operator are deployed, permits the flight of a drone within areas in which the operator or one of the VOs can visually observe the drone.

If there are an operator and one or more VOs, however, the operator and the one or more VOs do not know when to visually observer a drone.

In order to solve this problem, a notification method of a timing at which a drone is to be visually observed according to an aspect of the present disclosure includes obtaining, at a notification device having a processor and a memory, drone positional information transmitted from the drone to the notification device, obtaining, at the notification device, remote terminal positional information transmitted from a plurality of remote terminals to the notification device, each terminal of the plurality of remote terminals to be held by an operator who visually observes and operates the drone and one or more visual observers who visually observe the drone, determining, by the notification device, on the basis of the drone positional information and the remote terminal positional information, at least either responsible observation areas, which are areas in which the operator and the one or more visual observers are to visually observe the drone, or responsible observation periods, which are periods for which the operator and the one or more visual observers are to visually observe the drone, and notifying the plurality of remote terminals of at least either the responsible observation areas or the responsible observation periods determined in the determining, by transmitting data corresponding to the at least either the responsible observation areas or the responsible observation periods.

With this configuration, at least either the responsible observation areas, which are the areas in which the operator who visually observes and operates the drone and the one or more visual observers who visually observe the drone are to visually observe the drone, or the responsible observation periods, which are the periods for which the operator and the one or more visual observers are to visually observe the drone, are determined on the basis of the positional information regarding the drone and the positional information regarding the plurality of terminals carried by the operator and the one or more visual observers. The plurality of terminals are then notified of at least either the responsible observation areas or the responsible observation periods.

Since the plurality of terminals are notified of the responsible observation areas or the responsible observation periods, the operator and the one or more visual observers can understand when to visually observer the drone.

In addition, in the notification method, in the determining, at least either the responsible observation areas or the responsible observation periods may be determined on the basis of the drone positional information, the remote terminal positional information, and a flight route of the drone. In the notifying, the plurality of remote terminals may be notified of at least either the responsible observation areas or the responsible observation periods and the flight route.

With this configuration, at least either the responsible observation areas or the responsible observation periods are determined on the basis of the positional information regarding the drone, the positional information regarding the plurality of terminals, and the flight route of the drone. The plurality of terminals are then notified of at least either the responsible observation areas or the responsible observation periods and the flight route.

Since the plurality of terminals are notified of the flight route as well as at least either the responsible observation areas or the responsible observation periods, the operator and the one or more visual observers can understand when to visually observe the drone while checking the flight route of the drone.

In addition, in the notification method, the determining further comprises calculating and determining by the notification device flight periods, each of which is time taken for the drone to pass through a corresponding one of the responsible observation areas along the flight route, as the responsible observation periods.

With this configuration, the flight periods, each of which is the time taken for the drone to pass through the corresponding one of the responsible observation areas along the flight route, are calculated and determined as the responsible observation periods.

Since the plurality of terminals are notified of the flight periods, the operator and the one or more visual observers can understand how long the operator and the one or more visual observers need to visually observe the drone.

In addition, in the notification method, the determining further comprises calculating and determining by the notification device observation start times, each of which is a time at which the drone enters a corresponding one of the responsible observation areas along the flight route, as the responsible observation periods.

With this configuration, the observation start times, each of which is the time at which the drone enters the corresponding one of the responsible observation areas along the flight route, are calculated and determined as the responsible observation periods.

Since the plurality of terminals are notified of the observation start times, the operator and the one or more visual observers can understand when to visually observe the drone.

In addition, in the notification method, further comprising performing the notifying may be performed within a certain period of time before each of the responsible observation periods.

With this configuration, since the notifying is performed the certain period of time before each of the responsible observation periods, the operator and the one or more visual observers can understand the responsible observation periods.

In addition, in the notification method, the determining further comprises calculating and determining by the notification device, if the drone passes through the responsible observation areas along the flight route at least twice each: first responsible observation start times, at each of which the drone enters a corresponding one of the responsible observation areas along the flight route, as first responsible observation periods, and second observation start times, at each of which the drone enters the corresponding one of the responsible observation areas, as second responsible observation periods. The notifying further comprises notifying the plurality of remote terminals of the first responsible observation periods and the second responsible observation periods.

With this configuration, if the drone passes through the responsible observation areas along the flight route at least twice each, the first responsible observation start times, at each of which the drone enters the corresponding one of the responsible observation areas along the flight route, are calculated and determined as the first responsible observation periods and the second observation start times, at each of which the drone enters the corresponding one of the responsible observation areas, are calculated and determined as the second responsible observation periods. The plurality of terminals are then notified of the first responsible observation periods and the second responsible observation periods.

As a result, when the drone flies between a start point and an arrival point, the operator and the one or more visual observers can understand when to visually observe the drone in each flight.

In addition, the notification method may further include determining by the notification device, on the basis of the remote terminal positional information and the flight route, incoming directions, in which the drone is coming into the responsible observation areas. The notifying further comprises also notifying the plurality of remote terminals of the incoming directions.

With this configuration, the incoming directions, in which the drone is coming into the responsible observation areas, are determined on the basis of the positional information regarding the plurality of terminals and the flight route. The plurality of terminals are then notified of the incoming directions.

Since the plurality of terminals are notified of the incoming directions, the operator and the one or more visual observers can easily find the drone coming into the responsible observation areas.

In addition, in the above notification method, the notifying further comprises notifying, if the responsible observation period of a second one of the plurality of remote terminals is changed in the responsible observation period of a first one of the plurality of remote terminals, the second remote terminal of a new responsible observation period and a reason why the responsible observation period has been changed.

With this configuration, if the responsible observation period of the second one of the plurality of terminals is changed in the responsible observation period of the first one of the plurality of terminals, the second terminal is notified of the new responsible observation period and the reason why the responsible observation period has been changed.

As a result, the operator or one of the one or more visual observers can understand why the responsible observation period has been changed.

In addition, in the notification method, the determining further comprises preceding, the responsible observation period of the first remote terminal, which is closer to the drone than the second remote terminal, the responsible observation period of the second remote terminal, if the responsible observation areas of a first one and a second one of the plurality of remote terminals overlap.

With this configuration, if the responsible observation areas of the first one and the second one of the plurality of terminals overlap, the responsible observation period of the first terminal, which is closer to the drone than the second terminal is, precedes the responsible observation period of the second terminal.

Since the responsible observation period of the first terminal precedes the responsible observation period of the second terminal if the responsible observation areas of the first and second terminals overlap, the operator or one of the one or more visual observers need not visually observe the drone for an extended period of time.

In addition, in the notification method, further comprising regularly performing the obtaining of the drone positional information and the obtaining of the remote terminal positional information. The determining further comprises determining, if a distance between the drone and a third one of the plurality of remote terminals becomes equal to or smaller than a certain value, a present time as the responsible observation period of the remote third terminal.

With this configuration, the positional information regarding the drone and the positional information regarding the plurality of terminals are regularly obtained. If the distance between the drone and the third one of the plurality of terminals becomes equal to or smaller than the certain value, the present time is determined as the responsible observation period of the third terminal.

Since the operator or one of the one or more visual observers who is closer to the drone visually observes the drone, the drone can be visually observed more certainly.

In addition, in the notification method, if refusal information for refusing to visually observe the drone is received from the first remote terminal: in the determining, determining a present time as the responsible observation period of the second remote terminal, and in the notifying, notifying the second remote terminal of the responsible observation period and a reason why the present time has been determined as the responsible observation period of the second remote terminal.

With this configuration, if the refusal information for refusing to visually observe the drone is received from the first terminal, the present time is determined as the responsible observation period of the second terminal. The second terminal is then notified of the responsible observation period and the reason why the present time has been determined as the responsible observation period of the second terminal.

As a result, the operator or one of the one or more visual observer who carries the second terminal can understand why the present time has been determined as the responsible observation period of the second terminal.

A notification device according to another aspect of the present disclosure includes storage that stores drone positional information transmitted from a drone and remote terminal positional information transmitted from a plurality of remote terminals, each terminal of the plurality of remote terminals to be held by an operator who visually observes and operates the drone and one or more visual observers who visually observe the drone, and circuitry that, in operation, performs operations including determining, on the basis of the drone positional information and the remote terminal positional information, at least either responsible observation areas, which are areas in which the operator and the one or more visual observers are to visually observe the drone, or responsible observation periods, which are periods for which the operator and the one or more visual observers are to visually observe the drone, and notifying the plurality of remote terminals of at least either the responsible observation areas or the responsible observation periods.

With this configuration, the storage stores the positional information regarding the drone and the positional information regarding the plurality of terminals, which are carried by the operator who visually observes and operates the drone and the one or more visual observers who visually observe the drone. At least either the responsible observation areas, which are the areas in which the operator and the one or more visual observers are to visually observe the drone, or the responsible observation periods, which are the periods for which the operator and the one or more visual observers are to visually observe the drone, are determined on the basis of the positional information regarding the drone and the positional information regarding the plurality of terminals. The plurality of terminals are then notified of at least either the responsible observation areas or the responsible observation periods.

Since the plurality of terminals are notified of the responsible observation areas or the responsible observation periods, the operator and the one or more visual observers can understand when to visually observer the drone.

A remote terminal according to another aspect of the present disclosure includes a communicator that receives at least either responsible observation areas, which are areas in which an operator who visually observes and operates a drone and one or more visual observers who visually observe the drone are to visually observe the drone, or responsible observation periods, which are periods for which the operator and the one or more visual observers are to visually observe the drone, and a display that displays at least either the responsible observation areas or the responsible observation periods received from the communicator.

With this configuration, at least either the responsible observation areas, which are the areas in which the operator who visually observes and operates the drone and the one or more visual observers who visually observe the drone are to visually observe the drone, or the responsible observation periods, which are the periods for which the operator and the one or more visual observers are to visually observe the drone, are received. At least either the responsible observation areas or the responsible observation periods are then displayed.

Since the responsible observation areas or the responsible observation periods are displayed, the operator and the one or more visual observers can understand when to visually observer the drone.

Embodiments of the present disclosure will be described hereinafter with reference to the accompanying drawings. The following embodiments are specific examples of the present disclosure and do not limit the technical scope of the present disclosure.

First Embodiment

A flight control system according to a first embodiment will be described. In the first embodiment, a case will be described in which there are one operator who operates a drone and three VOs. The operator has a controller for controlling the drone, and the three VOs who have VO terminals.

FIG. 1 is a diagram illustrating the configuration of the flight control system according to the first embodiment of the present disclosure. The flight control system illustrated in FIG. 1 includes a notification device 10, a drone 30, a controller 20 for controlling the drone 30, three VO terminals 21, and a flight route setting terminal 40.

The notification device 10 is a server, for example, and notifies the controller 20 and the VO terminals 21 of timings at which the drone is to be visually observed. The notification device 10 is communicably connected to the controller 20, the VO terminals 21, the drone 30, and the flight route setting terminal 40 through a network 50. The network 50 is, for example, the Internet.

The controller 20 is operated by an operator 1 and remotely controls the drone 30. The controller 20 wirelessly, for example, transmits control information for controlling the drone 30 to the drone 30. The operator 1 flies the drone 30 along a flight route predetermined by the flight route setting terminal 40. In addition, the controller 20 is notified, by the notification device 10, of a timing at which the drone 30 is to be visually observed.

The VO terminals 21 are operated by VOs 2, 3, and 4 who visually observe the drone 30 along with the operator 1. The VOs 2, 3, and 4 carry the VO terminals 21. The VO terminals 21 are, for example, mobile phones, smartphones, tablet computers, or laptop computers. The VO terminals 21 are notified, by the notification device 10, of timings at which the drone 30 is to be visually observed. Although the flight control system includes three VO terminals 21 in FIG. 1, it is sufficient that the flight control system includes at least one VO terminal 21. The controller 20 and the VO terminals 21 correspond to display devices.

While the drone 30 is flying, the operator 1 and the VOs 2, 3, and 4 may or may not move.

The operator 1 remotely operates the drone 30 using the controller 20. The drone 30 receives control information from the controller 20 and flies on the basis of the received control information. The drone 30 includes a plurality of propellers and moves forward, rearward, leftward, rightward, upward, and downward by controlling rotation speeds of the plurality of propellers.

The flight route setting terminal 40 determines a flight route of the drone 30 and transmits the determined flight route to the notification device 10. The flight route setting terminal 40 is, for example, a mobile phone, a smartphone, a tablet computer, or a personal computer. The flight route setting terminal 40 receives a flight start point, an arrival point, and a waypoint of the drone 30 input by a user, for example, and determines a flight route connecting the received flight start point, arrival point, and a waypoint.

Although the drone 30 is remotely controlled by the controller 20 such that the drone 30 flies along a flight route in the present embodiment, the present disclosure is not particularly limited to this. The drone 30 need not be remotely controlled by the controller 20 but may autonomously fly along a flight route, instead. In this case, the flight control system need not include the controller 20. Alternatively, when the drone 30 autonomously flies, the controller 20 may transmit, to the drone 30, only an instruction to start to fly.

Figure 2:
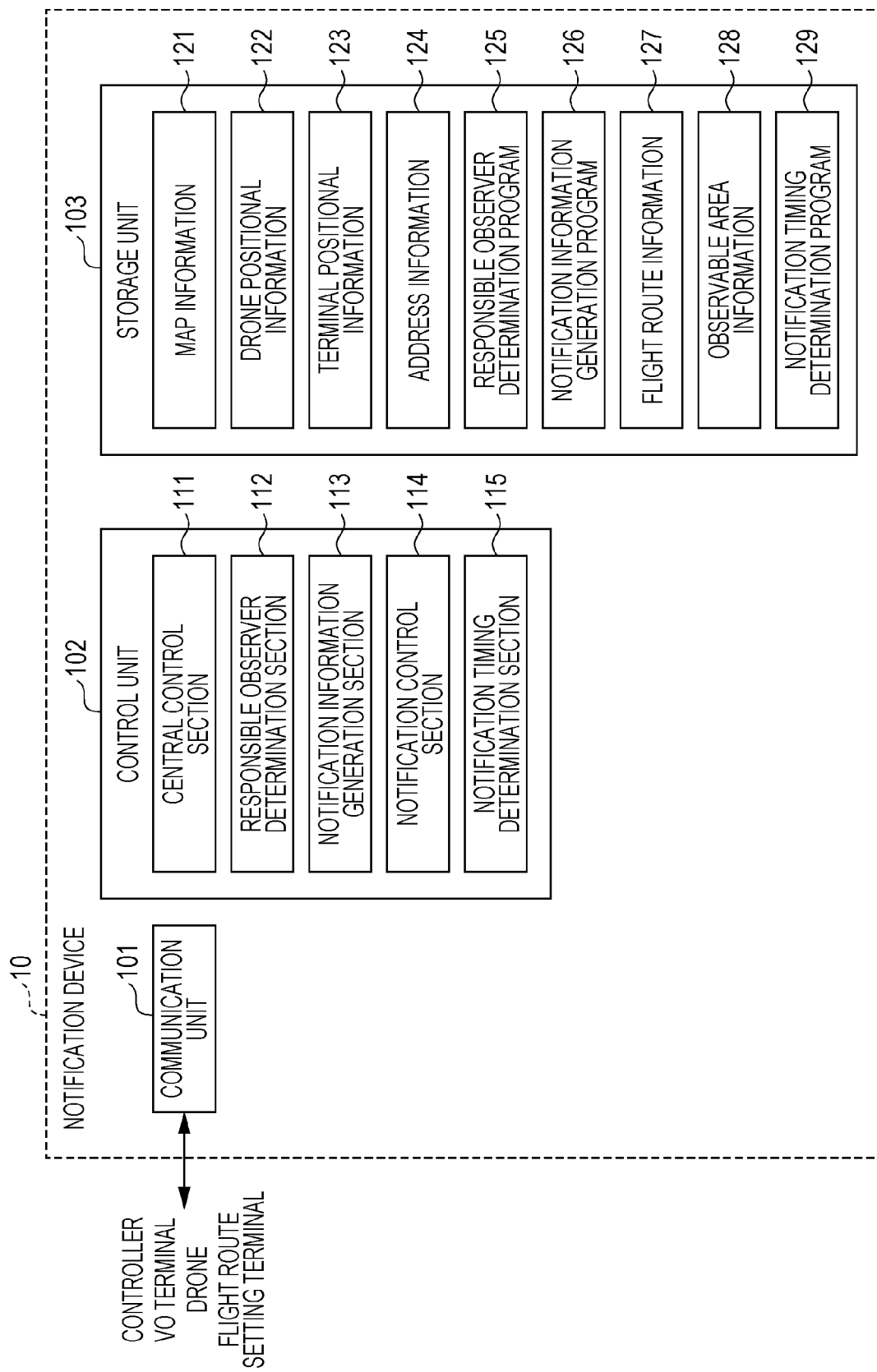
FIG. 2 is a block diagram illustrating the configuration of a notification device according to the first embodiment of the present disclosure.

FIG. 2 is a block diagram illustrating the configuration of the notification device 10 according to the first embodiment of the present disclosure. The notification device 10 illustrated in FIG. 2 includes a communication unit 101, a control unit 102, and a storage unit 103.

The communication unit 101 transmits various pieces of information to the controller 20, the VO terminals 21, and the drone 30 and receives various pieces of information from the controller 20, the VO terminals 21, the drone 30, and the flight route setting terminal 40 through the network 50. The communication unit 101 receives drone positional information indicating a position of the drone 30 transmitted from the drone 30 and stores the received drone positional information in the storage unit 103. The communication unit 101 receives a plurality of pieces of terminal positional information indicating positions of the controller 20 and the VO terminals 21 transmitted from the controller 20 and the VO terminals 21, respectively, and stores the plurality of received pieces of terminal positional information in the storage unit 103. The operator 1 and the VOs 2, 3, and 4 are a plurality of responsible observer candidates, who are candidates for a responsible observer, who is to visually observe the drone 30.

The communication unit 101 receives flight route information transmitted from the flight route setting terminal 40 and stores the received flight route information in the storage unit 103. The flight route information is represented, for example, by latitudes, longitudes, and altitudes of a flight start point, an arrival point, and a waypoint of the drone 30.

The control unit 102 is a central processing unit (CPU), for example, and controls the operation of the notification device 10. The control unit 102 includes a central control section 111, a responsible observer determination section 112, a notification information generation section 113, a notification control section 114, and a notification timing determination section 115.

The central control section 111 controls the operation of components of the notification device 10. The central control section 111 obtains drone positional information indicating the position of the drone 30. The central control section 111 obtains a plurality of pieces of terminal positional information indicating positions of terminals carried by a plurality of responsible observer candidates, who are candidates for a responsible observer, who is to visually observe the drone 30.

The responsible observer determination section 112 determines, on the basis of the drone positional information and the plurality of pieces of terminal positional information, responsible observation areas, which are areas in which the plurality of responsible observer candidates are to visually observe the drone 30 as responsible observers.

The notification information generation section 113 generates notification information for notifying the terminals carried by the plurality of responsible observer candidates of responsible observation areas determined by the responsible observer determination section 112.

The notification control section 114 transmits notification information to the terminals carried by the plurality of responsible observer candidates on the basis of address information stored in the storage unit 103. That is, the notification control section 114 notifies the terminals carried by the plurality of responsible observer candidates of responsible observation areas.

The notification timing determination section 115 determines a notification timing at which notification information is transmitted to the terminals carried by the plurality of responsible observer candidates. The notification timing will be described later.

The storage unit 103 is a hard disk drive, for example, and stores various pieces of information. The storage unit 103 stores map information 121, drone positional information 122, terminal positional information 123, address information 124, a responsible observer determination program 125, a notification information generation program 126, flight route information 127, observable area information 128, and a notification timing determination program 129.

The map information 121 may be stored in the storage unit 103 in advance or may be received from a server that provides maps.

The drone positional information 122 indicates a current position of the drone 30. The terminal positional information 123 indicates current positions of the controller 20 carried by the operator 1 and the VO terminals 21 carried by the VOs 2, 3, and 4.

The address information 124 indicates addresses of the controller 20 and the VO terminals 21 on the network 50 to which notification information is transmitted.

The responsible observer determination program 125 is used to determine responsible observation areas, which are areas in which the plurality of responsible observer candidates are to visually observe the drone 30 as responsible observers.

The notification information generation program 126 is used to generate notification information for notifying the terminals carried by the plurality of responsible observer candidates of responsible observation areas.

The flight route information 127 indicates a flight route of the drone 30.

The observable area information 128 indicates observable areas, which are areas in which the operator 1 and the VOs 2, 3, and 4 can visually observe the drone 30. The observable areas are determined in advance for the operator 1 and the VOs 2, 3, and 4. The observable areas are, for example, hemispherical areas whose centers are current positions of the operator 1 and the VOs 2, 3, and 4 and whose radii are certain distances.

The notification timing determination program 129 is used to determine a timing at which notification information is transmitted.

Figure 3:
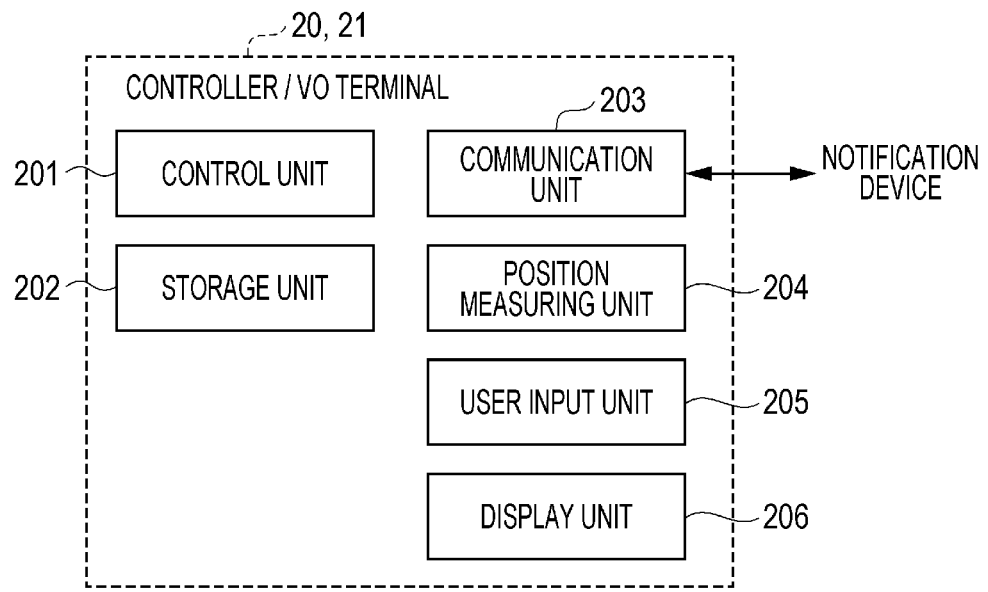
FIG. 3 is a block diagram illustrating the configuration of a controller and VO terminals according to the first embodiment of the present disclosure.

FIG. 3 is a block diagram illustrating the configuration of the controller 20 and the VO terminals 21 according to the first embodiment of the present disclosure. The basic configuration of the controller 20 and that of the VO terminals 21 are the same. The controller 20 or a VO terminal 21 illustrated in FIG. 3 includes a control unit 201, a storage unit 202, a communication unit 203, a position measuring unit 204, a user input unit 205, and a display unit 206.

The control unit 201 is a CPU, for example, and controls the operation of the controller 20 and the VO terminals 21. The storage unit 202 is a semiconductor memory, for example, and stores various pieces of information.

The communication unit 203 wirelessly transmits various pieces of information to the notification device 10 and wirelessly receives various pieces of information from the notification device 10. The communication unit 203 receives notification information transmitted from the notification device 10. The communication unit 203 of the controller 20 also wirelessly transmits control information for remotely controlling the drone 30 to the drone 30.

The position measuring unit 204 is a global positioning system (GPS), for example, and obtains the current positions of the controller 20 and the VO terminals 21. The current positions of the controller 20 and the VO terminals 21 are represented by latitudes, longitudes, and altitudes. The communication unit 203 transmits, to the notification device 10, information indicating the current positions of the controller 20 and the VO terminals 21 obtained by the position measuring unit 204.

The user input unit 205 receives operations input by the operator 1 and the VOs 2, 3, and 4. The user input unit 205 of each VO terminal 21 is, for example, a touch panel. The user input unit 205 of the controller 20 includes, for example, a left stick provided on a left-hand side of the operator 1 and a right stick provided on a right-hand side of the operator 1. The operator 1 inclines the left and right sticks, and the user input unit 205 outputs angle information regarding inclination angles to the control unit 201. The movement of the drone 30 is controlled in accordance with the inclination angles. The control unit 201 generates control information for controlling the drone 30 in accordance with an operation input from the user input unit 205. The control information includes, for example, the angle information indicating the inclination angles of the left and right sticks.

The display unit 206 is a liquid crystal display device, for example, and displays various pieces of information. The display unit 206 displays a responsible observation area on the basis of notification information transmitted from the notification device 10.

Figure 4:
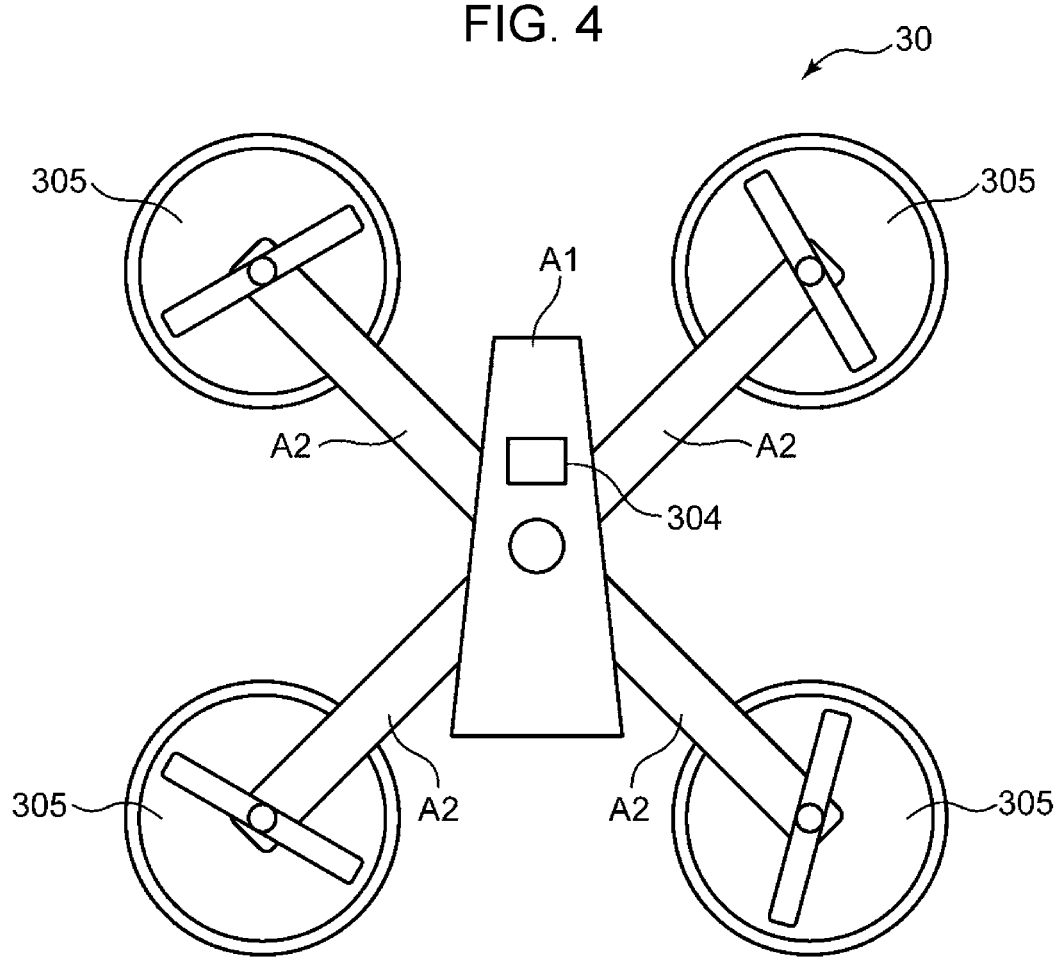
FIG. 4 is a diagram illustrating the appearance of a drone according to the first embodiment of the present disclosure.
Figure 5:
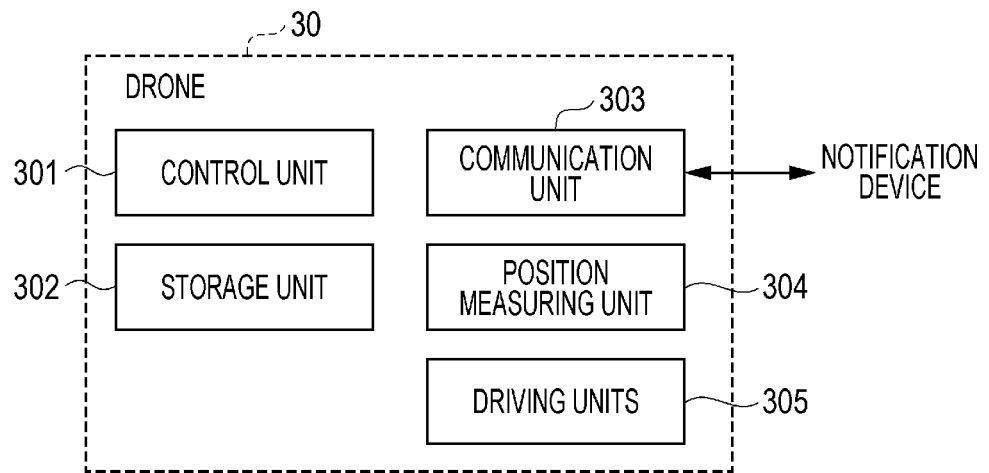
FIG. 5 is a block diagram illustrating the configuration of the drone according to the first embodiment of the present disclosure.

FIG. 4 is a diagram illustrating the appearance of the drone 30 according to the first embodiment of the present disclosure. FIG. 5 is a block diagram illustrating the configuration of the drone 30 according to the first embodiment of the present disclosure.

The drone 30 includes a body A1 and driving units 305 that generate the propulsion of the drone 30. The driving units 305 are attached to ends of four supports A2 extending from the body A1. A position measuring unit 304 is mounted on the body A1. A control unit 301, a storage unit 302, and a communication unit 303 are stored inside the body A1.

The control unit 301 is a CPU, for example, and controls the operation (flight) of the drone 30. The storage unit 302 is a semiconductor memory, for example, and stores various pieces of information.

The communication unit 303 wirelessly transmits various pieces of information to the notification device 10 and wirelessly receives various pieces of information from the notification device 10. The communication unit 303 wirelessly receives control information for remotely controlling the drone 30 from the controller 20.

The position measuring unit 304 is a GPS, for example, and obtains the current position of the drone 30.

The driving units 305 include propellers and motors that rotate the propellers. Although the drone 30 includes four driving units 305 in FIG. 4, the number of driving units 305 is not limited to this. The drone 30 may include, for example, five or more driving units 305, instead. The control unit 301 controls a flight direction and a flight state of the drone 30 by controlling the rotation speeds of the propellers of the driving units 305 as necessary.

Figure 6:
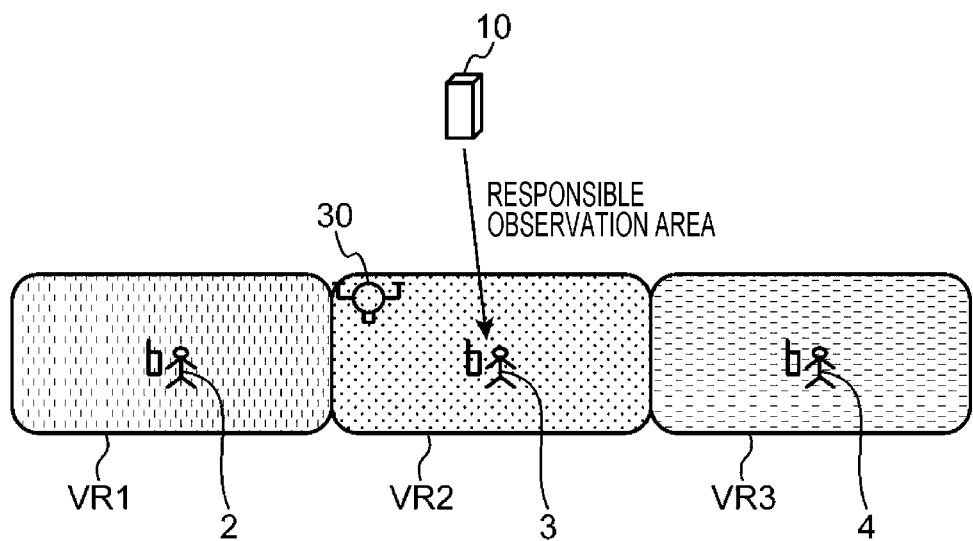
FIG. 6 is a schematic diagram illustrating responsible observation areas according to the first embodiment of the present disclosure.

FIG. 6 is a schematic diagram illustrating responsible observation areas according to the first embodiment of the present disclosure.

In FIG. 6, the VOs 2, 3, and 4 have observable areas VR1, VR2, and VR3, respectively. Sizes of the observable areas VR1, VR2, and VR3 are determined in advance. The VOs 2, 3, and 4 need to be deployed such that the observable areas VR1, VR2, and VR3 do not overlap around a flight route of the drone 30.

Since the VOs 2, 3, and 4 are deployed such that the observable areas VR1, VR2, and VR3 do not overlap, the VOs 2, 3, and 4 are notified of the observable areas VR1, VR2, and VR3, respectively, as responsible observation areas. The present disclosure, however, is not particularly limited to this. The observable areas VR1, VR2, and VR3 of the VOs 2, 3, and 4 may overlap, instead. Even in this case, it is preferable that a part in which two observable areas overlap be divided in half between two corresponding VOs or the part is included only in an observable area of one of the two corresponding VOs and the observable areas VR1, VR2, and VR3 of the VOs 2, 3, and 4 do not overlap.

Figure 7:
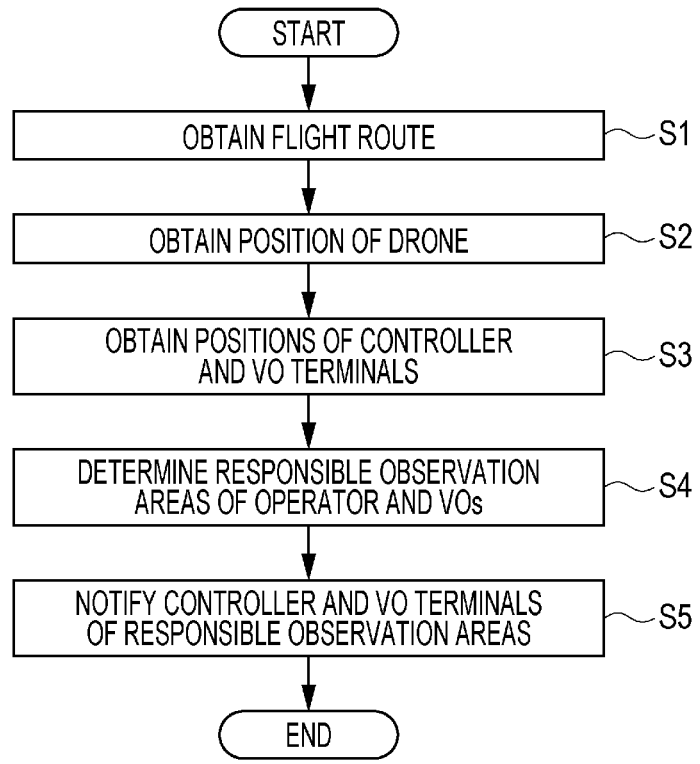
FIG. 7 is a flowchart illustrating the operation of the notification device according to the first embodiment of the present disclosure.

FIG. 7 is a flowchart illustrating the operation of the notification device 10 according to the first embodiment of the present disclosure.

It is assumed that the communication unit 101 of the notification device 10 has received flight route information transmitted from the flight route setting terminal 40 and stored the flight route information in the storage unit 103.

It is also assumed that the position measuring unit 304 of the drone 30 has obtained the current position of the drone 30, the communication unit 303 has transmitted the current position of the drone 30 to the notification device 10, and the communication unit 101 of the notification device 10 has received the positional information transmitted from the drone 30 and stored the positional information in the storage unit 103.

It is also assumed that the position measuring units 204 of the controller 20 and the VO terminals 21 have obtained the current positions of the controller 20 and the VO terminals 21, respectively, the communication units 203 have transmitted the obtained current positions of the controller 20 and the VO terminals 21 to the notification device 10, and the communication unit 101 of the notification device 10 has received the positional information transmitted from the controller 20 and the VO terminals 21 and stored the positional information in the storage unit 103.

Alternatively, the communication unit 101 of the notification device 10 may regularly obtain the current positions of the drone 30, the controller 20, and the VO terminals 21 and store the positional information in the storage unit 103.

First, in step S1, the central control section 111 obtains flight route information from the storage unit 103.

Next, in step S2, the responsible observer determination section 112 obtains the position of the drone 30 from the storage unit 103.

Next, in step S3, the responsible observer determination section 112 obtains the positions of the controller 20 and the VO terminals 21 from the storage unit 103.

Next, in step S4, the responsible observer determination section 112 determines responsible observation areas of the operator 1 and the VOs 2, 3, and 4. More specifically, the responsible observer determination section 112 obtains observable areas from the storage unit 103 and determines the observable areas, whose centers are the positions of the controller 20 and the VO terminals 21, as responsible observation areas of the operator 1 and the VOs 2, 3, and 4.

Next, in step S5, the notification control section 114 notifies the controller 20 and the VO terminals 21 of the responsible observation areas of the operator 1 and the VOs 2, 3, and 4, respectively. More specifically, the notification information generation section 113 generates notification information for notifying the operator 1 and the VOs 2, 3, and 4 of the responsible observation areas determined by the responsible observer determination section 112. As illustrated in FIG. 6, for example, the observable areas VR1, VR2, and VR3 are the responsible observation areas of the VOs 2, 3, and 4, respectively. At this time, the notification information generation section 113 may include the flight route information in the notification information. The notification control section 114 transmits the generated notification information to the controller 20 and the VO terminals 21 through the communication unit 101.

The communication units 203 of the controller 20 and the VO terminals 21 receive the notification information transmitted from the notification device 10. The control units 201 display the responsible observation areas on the display units 206 on the basis of the received notification information.

The operation of the notification device 10 illustrated in FIG. 7 may start when the drone 30 starts to fly or when the notification device 10 has received a flight route. Alternatively, the operation of the notification device 10 may be performed regularly.

The controller 20 and the VO terminals 21 may be notified of the responsible observation areas of the operator 1 and the VOs 2, 3, and 4 when the flight route has been determined (obtained), when the drone 30 has started to fly, when the drone 30 has entered each responsible observation area, a certain period of time before the drone 30 enters each responsible observation area, or when the drone 30 has reached a position a certain distance away from each responsible observation area. Alternatively, the controller 20 and the VO terminals 21 may be regularly notified of the responsible observation areas of the operator 1 and the VOs 2, 3, and 4.

Alternatively, the controller 20 and the VO terminals 21 may be notified of the responsible observation areas of the operator 1 and the VOs 2, 3, and 4 when the notification device 10 has received a request to change a responsible observer from the controller 20 or one of the VO terminals 21.

Alternatively, the controller 20 and the VO terminals 21 may be notified of the responsible observation areas of the operator 1 and the VOs 2, 3, and 4 when the position of the operator 1 or the position of one of the VOs 2, 3, and 4 has been changed by a certain distance or more.

Alternatively, the controller 20 and the VO terminals 21 may be notified of the responsible observation areas of the operator 1 and the VOs 2, 3, and 4 when a responsible observer has been changed.

Furthermore, the terminals carried by the plurality of responsible observer candidates (the operator 1 and the VOs 2, 3, and 4) may display all the responsible observation areas of the plurality of responsible observer candidates or only a corresponding responsible observation area.

Figure 8:
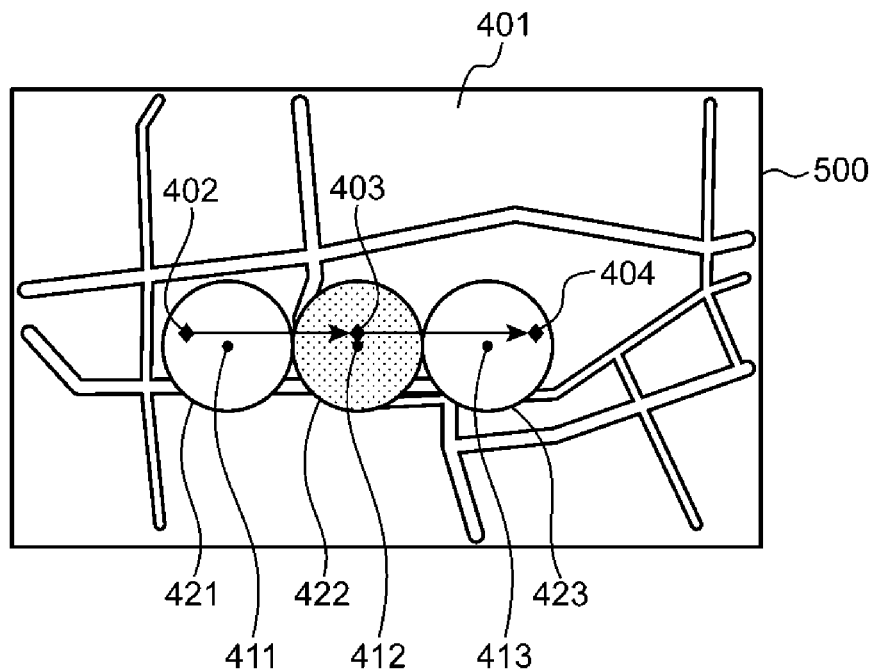
FIG. 8 is a diagram illustrating a display screen displayed on one of display units of the controller and the VO terminals according to the first embodiment of the present disclosure.

FIG. 8 is a diagram illustrating an example of a display screen displayed on one of the display units 206 of the controller 20 and the VO terminals 21 according to the first embodiment of the present disclosure.

A display screen 500 illustrated in FIG. 8 includes, on a map image 401, an icon 402 indicating a start point, an icon 403 indicating a waypoint, and an icon 404 indicating an arrival point. A flight route is represented by connecting the icons 402, 403, and 404 with arrows. The icons 402, 403, and 404 may be distinguishably displayed by using different colors or shapes.

The display screen 500 also includes, on the map image 401, icons 411, 412, and 413 indicating the positions of the VO terminals 21 carried by the VOs 2, 3, and 4, respectively. In the example illustrated in FIG. 8, there is no operator 1 and only the VOs 2, 3, and 4 exist.

The display screen also includes, on the map image 401, responsible observation areas 421, 422, and 423 of the VOs 2, 3, and 4, respectively. The icons 411, 412, and 413 may be distinguishably displayed by using different colors or shapes. In addition, information (e.g., names) for identifying corresponding VOs may be displayed near the icons 411, 412, and 413.

The responsible observation areas 421, 422, and 423 may be distinguishably displayed by using different colors or shapes. As illustrated in FIG. 8, for example, in the display screen 500 displayed on the VO terminal 21 carried by the VO 3, the responsible observation area 422 of the VO 3 is displayed differently from the other responsible observation areas 421 and 423 so that the VO 3 can easily identify his/her own responsible observation area.

Second Embodiment

Next, a flight control system according to a second embodiment will be described.

If a flight route, positions of responsible observation areas, sizes of the responsible observation areas, and the speed of a drone 30 are determined in advance, time taken for the drone 30 to pass through each responsible observation area can be calculated. In the second embodiment, therefore, a notification device 10 notifies a controller 20 and VO terminals 21 not only responsible observation areas but also responsible observation periods, for which the plurality of responsible observer candidates are to visually observe the drone 30 as responsible observers.

Figure 9:
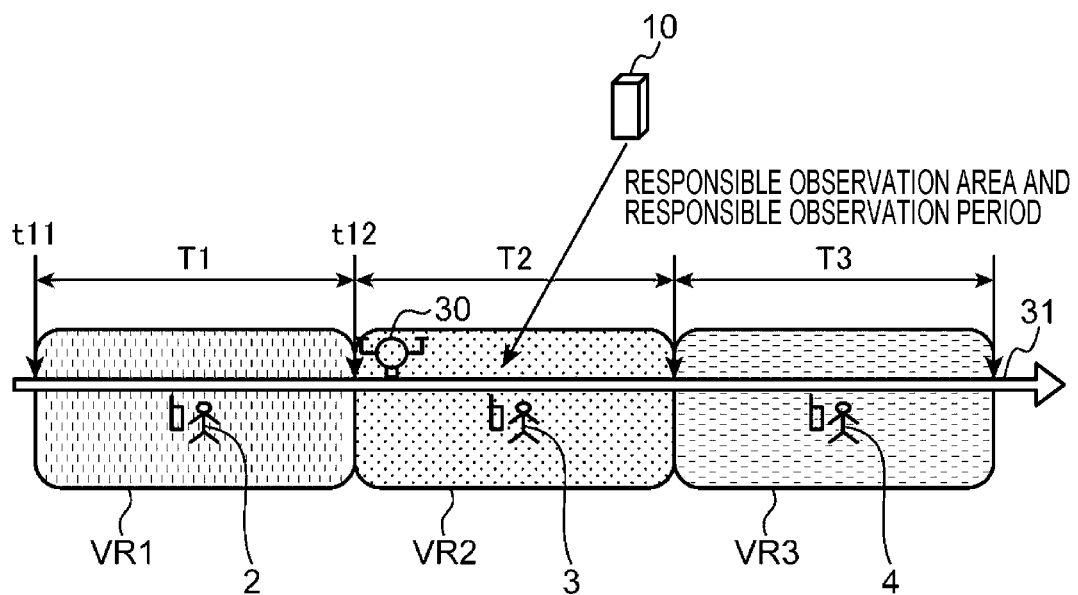
FIG. 9 is a schematic diagram illustrating responsible observation areas and responsible observation periods according to a second embodiment of the present disclosure.

FIG. 9 is a schematic diagram illustrating responsible observation areas and responsible observation periods T1, T2, and T3 according to the second embodiment of the present disclosure.

As illustrated in FIG. 9, the sizes of the observable areas VR1, VR2, and VR3 of the VOs 2, 3, and 4 are determined in advance. The VOs 2, 3, and 4 are deployed such that the observable areas VR1, VR2, and VR3 do not overlap in a flight route of the drone 30. The observable areas VR1, VR2, and VR3 are the responsible observation areas of the VOs 2, 3, and 4, respectively. The notification device 10 notifies the controller 20 and the VO terminals 21 of the observable areas VR1, VR2, and VR3 of the VOs 2, 3, and 4 as the responsible observation areas.

In addition, as illustrated in FIG. 9, time periods T1, T2, and T3 are provided for the VOs 2, 3, and 4, respectively. The speed of the drone 30 is determined in advance. Time taken for the drone 30 to pass through the responsible observation area (observable area VR2) of the VO 2, therefore, can be calculated by dividing a distance covered by the drone 30 to pass through the responsible observation area by the speed of the drone 30. If a flight start time of the drone 30 is identified, a time at which the drone 30 enters the responsible observation area of the VO 2 and a time at which the drone 30 exits the responsible observation area of the VO 2 can be calculated. With respect to the time period T1 provided for the VO 2, for example, a time t11 at which the drone 30 enters the responsible observation area of the VO 2 and a time t12 at which the drone 30 exits the responsible observation area of the VO 2 can be calculated.

Figure 10:
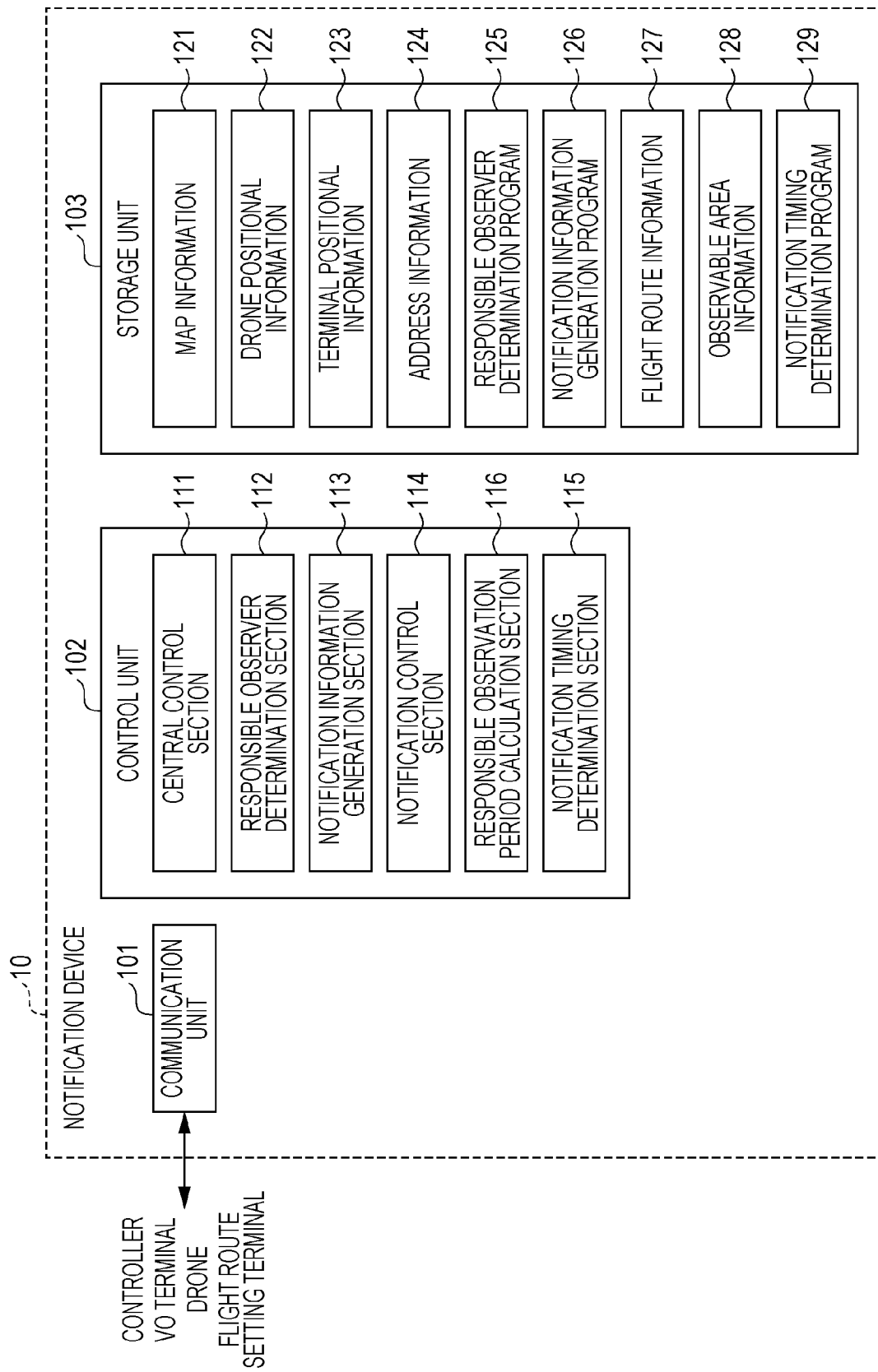
FIG. 10 is a block diagram illustrating the configuration of a notification device according to the second embodiment of the present disclosure.

FIG. 10 is a block diagram illustrating the configuration of the notification device 10 according to the second embodiment of the present disclosure. The configuration of the flight control system according to the second embodiment is the same as that of the flight control system illustrated in FIG. 1. The configuration of the controller 20, the VO terminals 21, and the drone 30 according to the second embodiment is the same as that of the controller 20, the VO terminals 21, and the drone 30 illustrated in FIGS. 3, 4, and 5.

The notification device 10 illustrated in FIG. 10 includes the communication unit 101, the control unit 102, and the storage unit 103. The same components as those of the notification device 10 according to the first embodiment are given the same reference numerals, and description thereof is omitted.

The control unit 102 is a CPU, for example, and controls the operation of the notification device 10. The control unit 102 includes the central control section 111, the responsible observer determination section 112, the notification information generation section 113, the notification control section 114, the notification timing determination section 115, and a responsible observation period calculation section 116.

The responsible observation period calculation section 116 determines, on the basis of the drone positional information 122 and the plurality of pieces of terminal positional information 123, responsible observation periods, for which the plurality of responsible observer candidates are to visually observe the drone 30 as responsible observers.

The notification information generation section 113 generates notification information for notifying the terminals carried by the plurality of responsible observer candidates of responsible observation areas determined by the responsible observer determination section 112 and responsible observation periods determined by the responsible observation period calculation section 116.

Alternatively, the responsible observation period calculation section 116 may calculate, on the basis of each responsible observation area and a flight route, time taken for the drone 30 to pass through the responsible observation area and determine the calculated time as the responsible observation periods.

Alternatively, the responsible observation period calculation section 116 may calculate, on the basis of each responsible observation area and a flight route, an observation start time, at which a responsible observer in the responsible observation area begins to visually observe the drone 30, and determine the calculated observation start time as a beginning of the responsible observation period. The notification control section 114 may notify the terminals carried by the plurality of responsible observer candidates of the responsible observation periods a certain period of time before the observation start times.

Figure 11:
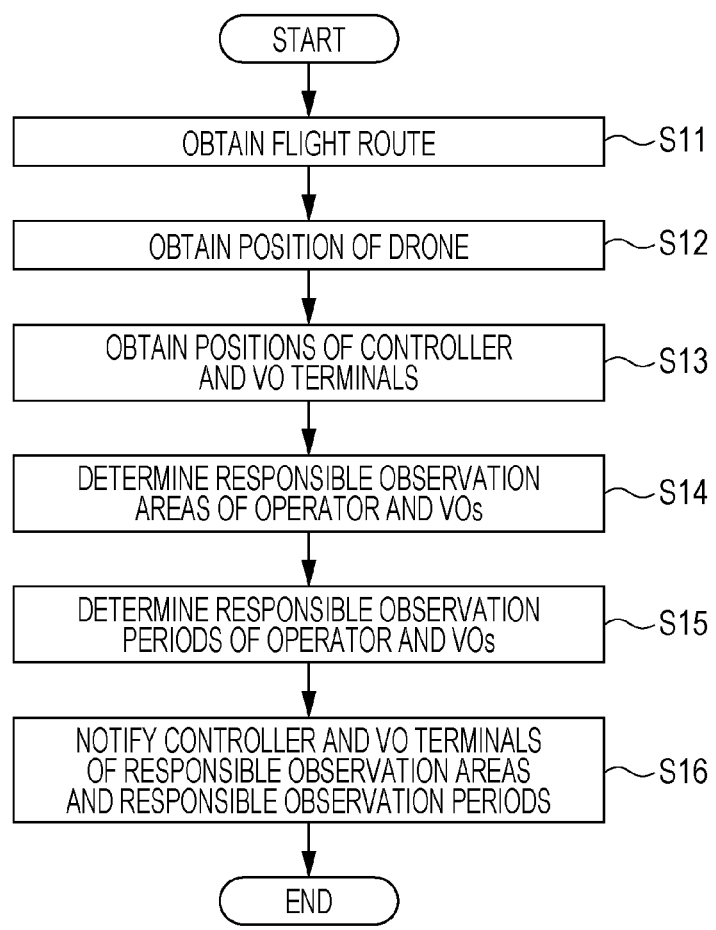
FIG. 11 is a flowchart illustrating the operation of the notification device according to the second embodiment of the present disclosure.

FIG. 11 is a flowchart illustrating the operation of the notification device 10 according to the second embodiment of the present disclosure.

Steps S11 to S14 are the same as steps S1 to S4, respectively, illustrated in FIG. 7, and description thereof is omitted.

Next, in step S15, the responsible observation period calculation section 116 determines, on the basis of the drone positional information 122 and the plurality of pieces of terminal positional information 123, responsible observation periods, for which the operator 1 and the VOs 2, 3, and 4 are to visually observe the drone 30 as responsible observers. The responsible observation periods include observation starts times at which the operator 1 and the VOs 2, 3, and 4 begin to visually observe the drone 30 and observation end times at which the operator 1 and the VOs 2, 3, and 4 stop visually observing the drone 30.

More specifically, the responsible observation period calculation section 116 calculates, on the basis of the flight route and the current position of the drone 30 and the responsible observation areas of the operator 1 and the VOs 2, 3, and 4, first flight distances, which are distances between the current position of the drone 30 and points in the responsible observation areas from which the drone 30 enters the responsible observation areas, and second flight distances, which are distances between the points in the responsible observation areas from which the drone 30 enters the responsible observation areas and points in the responsible observation areas from which the drone 30 exits the responsible observation areas. Next, the responsible observation period calculation section 116 obtains a flight start time and the flight speed of the drone 30.

Next, the responsible observation period calculation section 116 calculates, on the basis of the calculated first flight distances and the flight speed of the drone 30, first flight periods, which are time taken for the drone 30 to reach the responsible observation areas from the current position. Next, the responsible observation period calculation section 116 calculates, on the basis of the calculated second flight distances and the flight speed of the drone 30, second flight periods, which are time taken for the drone 30 to exit the responsible observation areas after the drone 30 enters the same responsible observation areas.

Next, the responsible observation period calculation section 116 calculates times at which the drone 30 enters the responsible observation areas, that is, observation start times, at which the operator 1 and the VOs 2, 3, and 4 begin to visually observe the drone 30, by adding the calculated first flight periods to the flight start time of the drone 30. Next, the responsible observation period calculation section 116 calculates times at which the drone 30 exits the responsible observation areas, that is, observation end times, at which the operator 1 and the VOs 2, 3, and 4 stops visually observing the drone 30, by adding the calculated second flight periods to the observation start times.

The responsible observation period calculation section 116 thus calculates the responsible observation periods of the operator 1 and the VOs 2, 3, and 4.

Next, in step S16, the notification control section 114 notifies the controller 20 and the VO terminals 21 of the responsible observation areas and the responsible observation periods of the operator 1 and the VOs 2, 3, and 4. More specifically, the notification information generation section 113 generates notification information for notifying the operator 1 and the VOs 2, 3, and 4 of the responsible observation areas determined by the responsible observer determination section 112 and the responsible observation periods determined by the responsible observation period calculation section 116. The notification information generation section 113 may include the flight route information 127 in the notification information. The notification control section 114 transmits the generated notification information to the controller 20 and the VO terminals 21 through the communication unit 101.

The communication units 203 of the controller 20 and the VO terminals 21 receive the notification information transmitted from the notification device 10. The control units 201 display the responsible observation areas and the responsible observation periods on the display units 206 on the basis of the received notification information.

The operation of the notification device 10 illustrated in FIG. 11 may start when the drone 30 starts to fly or when the notification device 10 has received a flight route. Alternatively, the operation of the notification device 10 illustrated in FIG. 11 may be performed regularly. Times at which the drone 30 reaches the responsible observation areas might change during flight due to weather or the like. If steps S11 to S16 are regularly performed, therefore, the responsible observers can be notified of more exact responsible observation times.

Alternatively, the controller 20 and the VO terminals 21 may be notified of the responsible observation areas and the responsible observation periods of the operator 1 and the VOs 2, 3, and 4 when determined observation starts time have been changed, instead of the timings described in the first embodiment. That is, the drone 30 might fly faster or slower than a preset speed due to weather or the like. If the responsible observation periods have been changed while the drone 30 is flying, therefore, it is desirable to notify the controller 20 and the VO terminals 21 of new responsible observation areas and responsible observation periods.

Figure 12:
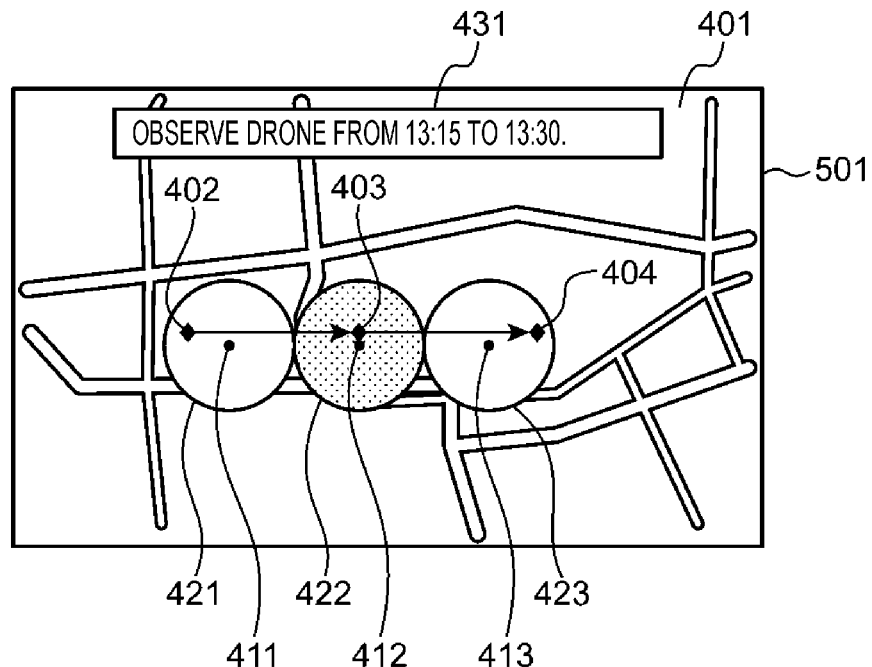
FIG. 12 is a diagram illustrating an example of a display screen displayed on one of display units of a controller and VO terminals according to the second embodiment of the present disclosure.

FIG. 12 is a diagram illustrating an example of a display screen displayed on one of the display units 206 of the controller 20 and the VO terminals 21 according to the second embodiment of the present disclosure. In a display screen 501 illustrated in FIG. 12, the same elements as those included in the display screen 500 illustrated in FIG. 8 are given the same reference numerals, and description thereof is omitted.

In the display screen 501 illustrated in FIG. 12, a message 431 indicating a responsible observation period is displayed. As described above, a responsible observation period includes an observation start time and an observation end time. If the observation start time is 13:15 and the observation end time is 13:30, the message 431 says, "Observe drone from 13:15 to 13:30".

Since responsible observer candidates are notified of responsible observation periods, for which the responsible observer candidates are to visually observe the drone 30 as responsible observers, the responsible observer candidates can easily understand when to visually observe the drone 30.

Figure 13:
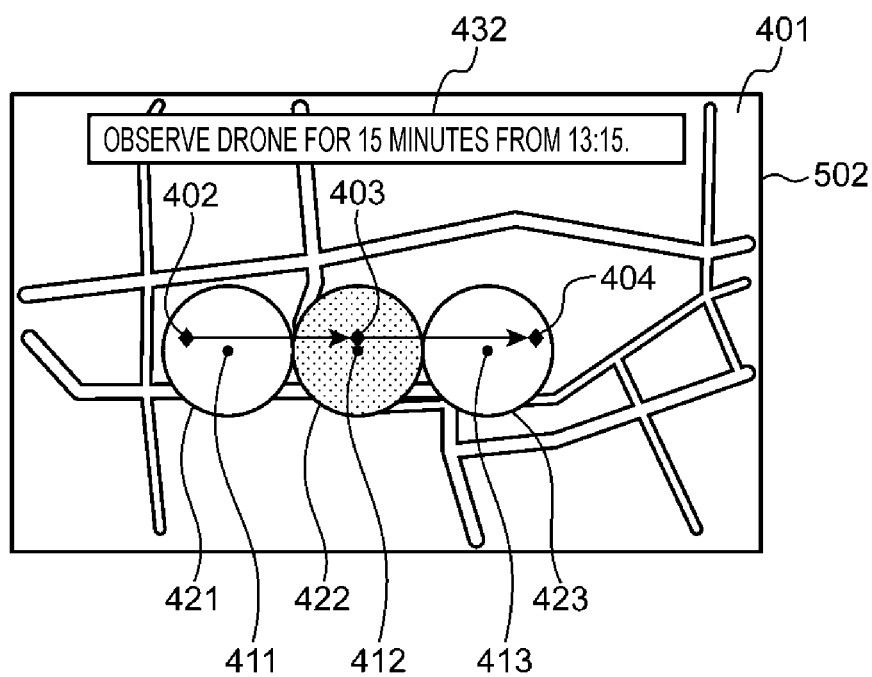
FIG. 13 is a diagram illustrating another example of the display screen displayed on one of the display units of the controller and the VO terminals according to the second embodiment of the present disclosure.

FIG. 13 is a diagram illustrating another example of the display screen displayed on one of the display units 206 of the controller 20 and the VO terminals 21 according to the second embodiment of the present disclosure. In a display screen 502 illustrated in FIG. 13, the same elements as those included in the display screen 500 illustrated in FIG. 8 are given the same reference numerals, and description thereof is omitted.

In the display screen 502 illustrated in FIG. 13, a message 432 indicating a responsible observation period is displayed. The responsible observation period includes an observation start time and a second flight period, which is time taken for the drone 30 to exit a responsible observation area after the drone 30 enters the responsible observation area. If the observation start time is 13:15 and the observation end time is 13:30, for example, the second flight period is 15 minutes. The message 432, therefore, says, "Observe drone for 15 minutes from 13:15".

Figure 14:
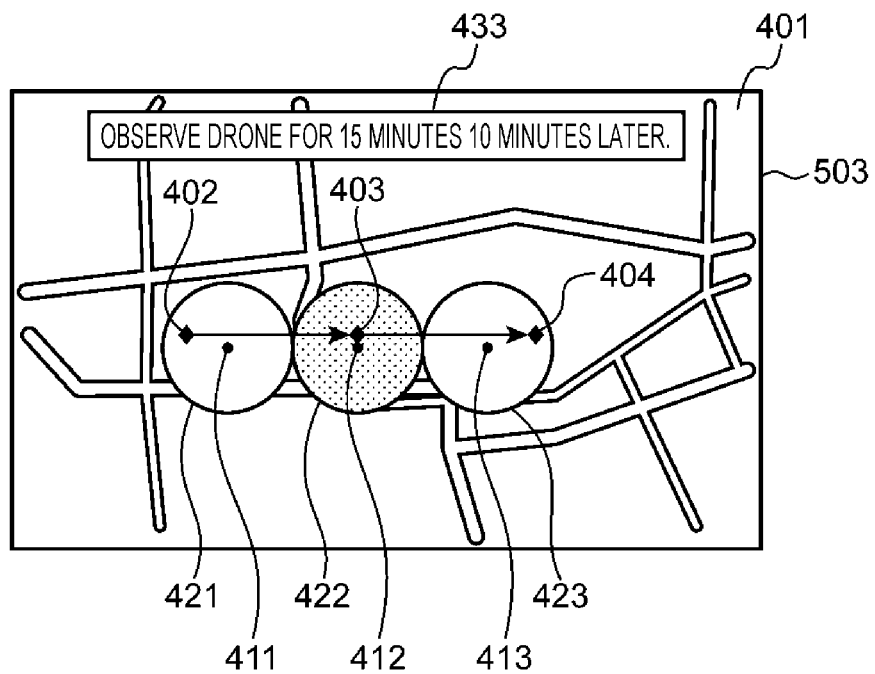
FIG. 14 is a diagram illustrating yet another example of the display screen displayed on one of the display units of the controller and the VO terminals according to the second embodiment of the present disclosure.

FIG. 14 is a diagram illustrating yet another example of the display screen displayed on one of the display units 206 of the controller 20 and the VO terminals 21 according to the second embodiment of the present disclosure. In a display screen 503 illustrated in FIG. 14, the same elements as those included in the display screen 500 illustrated in FIG. 8 are given the same reference numerals, and description thereof is omitted.

In the display screen 503 illustrated in FIG. 14, a message 433 indicating a responsible observation period is displayed. The responsible observation period includes a difference between a present time and an observation start time and a second flight period, which is time taken for the drone 30 to exit a responsible observation area after the drone 30 enters the responsible observation area. If the present time is 13:05 and the observation start time is 13:15, and if the second flight period is 15 minutes, for example, the message 433 says, "Observe drone for 15 minutes 10 minutes later".

Although the terminals carried by the plurality of responsible observer candidates are notified of responsible observation areas and responsible observation periods in the second embodiment, the present disclosure is not particularly limited to this. The terminals carried by the plurality of responsible observer candidates may be notified of only responsible observation periods, instead.

In addition, in the second embodiment, after the terminals carried by the plurality of responsible observer candidates are notified of responsible observation areas and responsible observation periods, all the terminals, or only an applicable terminal, carried by the plurality of responsible observer candidates may be notified that one of the responsible observation periods has ended.

In addition, in the second embodiment, after the terminals carried by the plurality of responsible observer candidates are notified of responsible observation areas and responsible observation periods, the terminals may reply to the notification device 10 that the terminals have received the notification.

Next, a modification of the second embodiment will be described. Although the drone 30 passes through the observable areas of the plurality of responsible observer candidates (the operator 1 and the VOs 2, 3, and 4) only once each in the second embodiment, the drone 30 passes through the observable areas of the plurality of responsible observer candidates (the operator 1 and the VOs 2, 3, and 4) a plurality of times each in the modification of the second embodiment.

Figure 15:
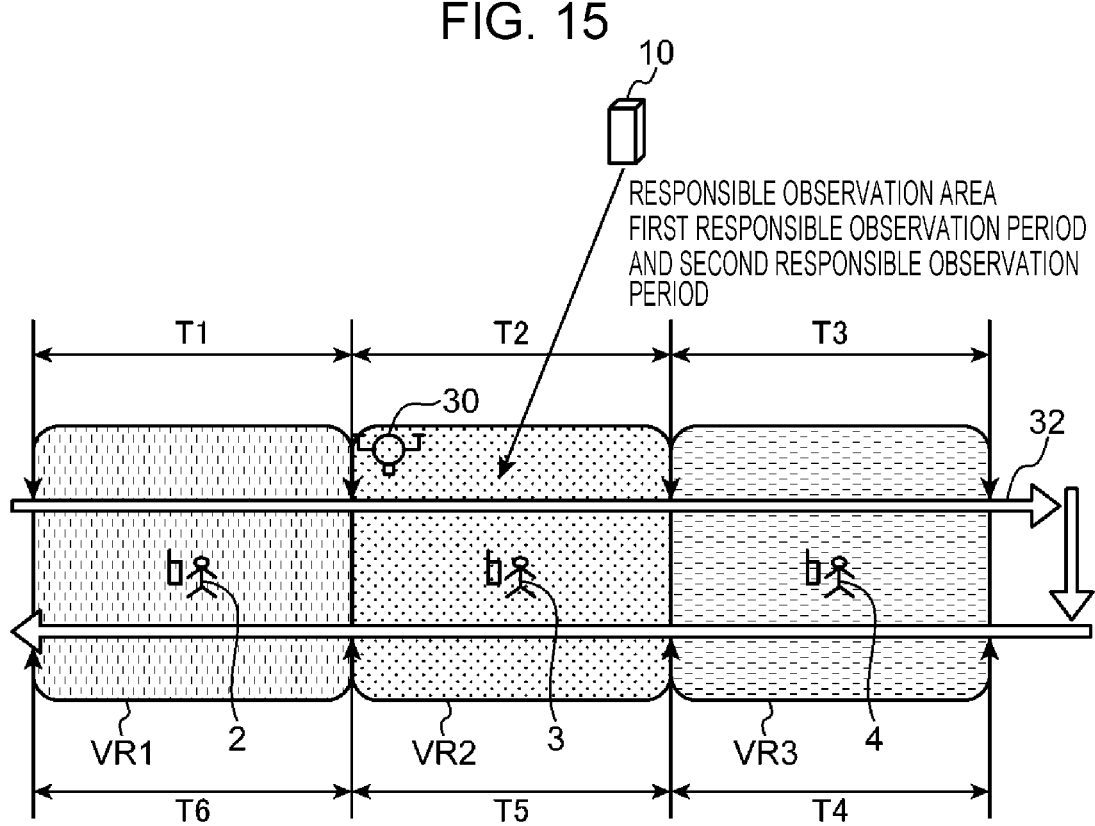
FIG. 15 is a schematic diagram illustrating responsible observation areas and responsible observation periods according to a modification of the second embodiment of the present disclosure.

FIG. 15 is a schematic diagram illustrating responsible observation areas and responsible observation periods according to the modification of the second embodiment of the present disclosure.

As illustrated in FIG. 15, the drone 30 flies along a flight route 32, which passes through the observable areas VR1, VR2, and VR3 of the VOs 2, 3, and 4 and then passes through the observable areas VR3, VR2, and VR1 of the VOs 4, 3, and 2 again. In this case, the VO terminals 21 carried by the VOs 2, 3, and 4 are notified of first responsible observation periods T1, T2, and T3, which are time taken for the drone 30 to exit the responsible observation areas after the drone 30 enters the same responsible observation areas for the first time, and second responsible observation periods T4, T5, and T6, which are time taken for the drone 30 to exit the responsible observation areas after the drone 30 enters the same responsible observation areas for the second time.

If the drone 30 exits each responsible observation area and then enters the responsible observation area again, the responsible observation period calculation section 116 determines, on the basis of the responsible observation area and a flight route, a first responsible observation period, which is time taken for the drone 30 to exit the responsible observation area after the drone 30 enters the responsible observation area for the first time, and a second responsible observation period, which is time taken for the drone 30 to exit the responsible observation area after the drone 30 enters the responsible observation area. The notification control section 114 notifies the terminals carried by the plurality of responsible observer candidates of the first responsible observation period and the second responsible observation period.

Figure 16:
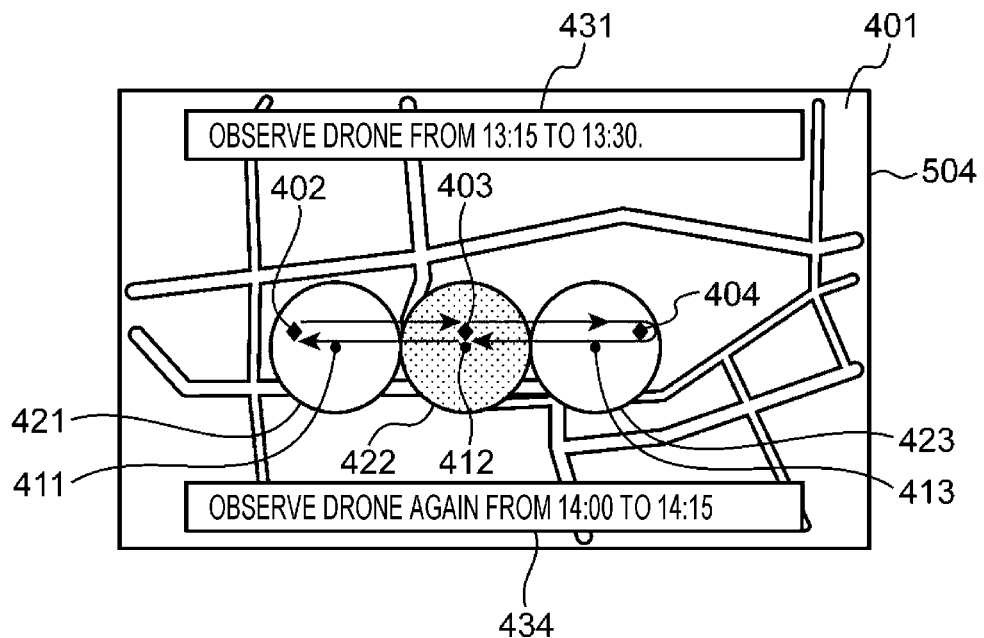
FIG. 16 is a diagram illustrating an example of a display screen displayed on one of display units of a controller and VO terminals according to the modification of the second embodiment of the present disclosure.

FIG. 16 is a diagram illustrating an example of a display screen displayed on one of the display units 206 of the controller 20 and the VO terminals 21 according to the modification of the second embodiment of the present disclosure. In a display screen 504 illustrated in FIG. 16, the same elements as those included in the display screen 500 illustrated in FIG. 8 are given the same reference numerals, and description thereof is omitted.

In the display screen 504 illustrated in FIG. 16, the message 431 indicating the first responsible observation period and a message 434 indicating the second responsible observation period is displayed. The first responsible observation period includes an observation start time and an observation end time. If the observation start time of the first responsible observation period is 13:15 and the observation end time is 13:30, for example, the message 431 says, "Observe drone from 13:15 to 13:30". The second responsible observation period includes an observation start time and an observation end time. If the observation start time of the second responsible observation period is 14:00 and the observation end time is 14:15, for example, the message 434 says, "Observe drone again from 14:00 to 14:15".

If the drone 30 passes through the same responsible observation area a plurality of times, a terminal is thus notified of a second responsible observation period as well as a first responsible observation period. As a result, a responsible observer does not forget the second responsible observation period.

Third Embodiment

Next, a flight control system according to a third embodiment of the present disclosure will be described.

Since responsible observation areas are large, a responsible observer might not find a drone 30 even if responsible observer candidates are notified of the responsible observation areas and responsible observation periods. In the third embodiment, therefore, a notification device 10 notifies VO terminals 21 of directions in which the drone 30 is coming, as well as the responsible observation areas and the responsible observation periods.

Figure 17:
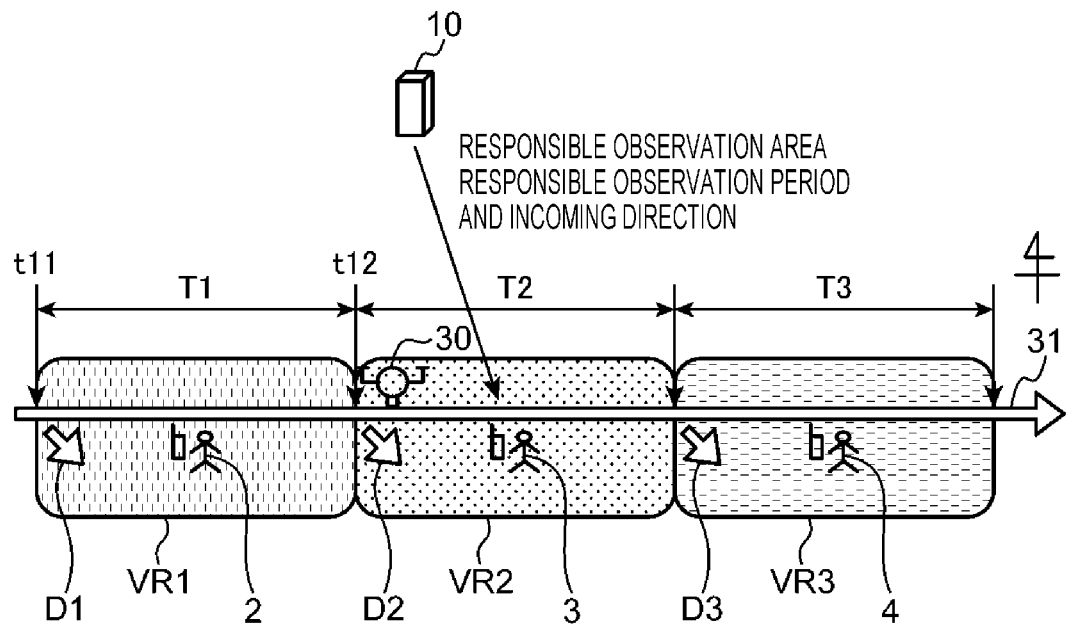
FIG. 17 is a schematic diagram illustrating incoming directions of a drone according to a third embodiment of the present disclosure.

FIG. 17 is a schematic diagram illustrating directions in which the drone 30 is coming according to the third embodiment of the present disclosure.

As illustrated in FIG. 17, the sizes of the observable areas VR1, VR2, and VR3 of the VOs 2, 3, and 4 are determined in advance. The VOs 2, 3, and 4 are deployed such that the observable areas VR1, VR2, and VR3 do not overlap along a flight route 31 of the drone 30. The observable areas VR1, VR2, and VR3 are responsible observation areas of the VOs 2, 3, and 4, respectively. The notification device 10 notifies the VO terminals 21 carried by the VOs 2, 3, and 4 of the observable areas VR1, VR2, and VR3 of the VOs 2, 3, and 4 as the responsible observation areas.

The notification device 10 also notifies the VO terminals 21 carried by the VOs 2, 3, and 4 of the responsible observation periods T1, T2, and T3, for which the VOs 2, 3, and 4, respectively, are to visually observe the drone 30 as the responsible observers.

The notification device 10 also notifies the VO terminals 21 carried by the VOs 2, 3, and 4 of directions D1, D2, and D3, respectively, in which the drone 30 is coming into the responsible observation areas.

Figure 18:
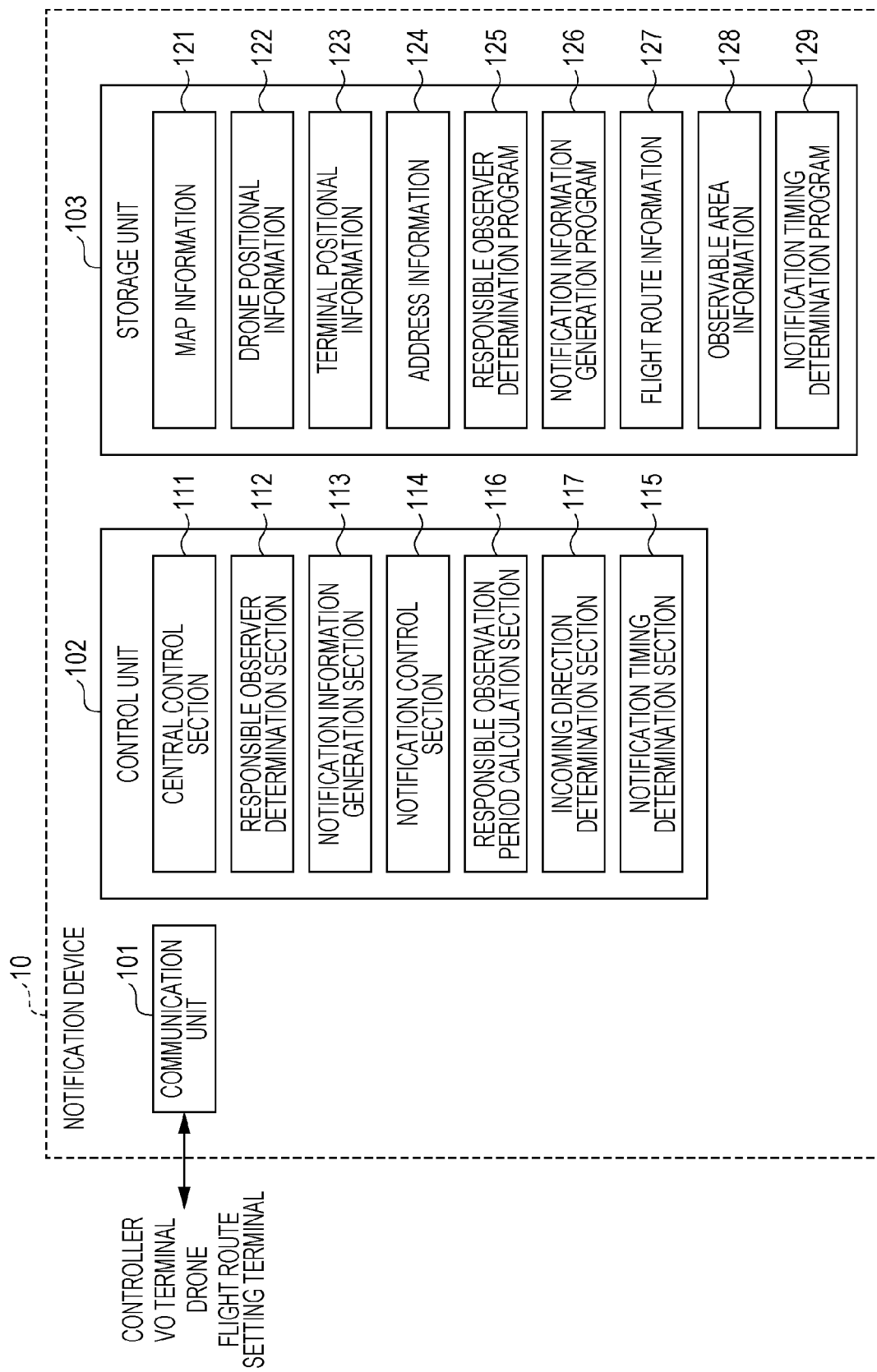
FIG. 18 is a block diagram illustrating the configuration of a notification device according to the third embodiment of the present disclosure.

FIG. 18 is a block diagram illustrating the configuration of the notification device 10 according to the third embodiment of the present disclosure. The configuration of the flight control system according to the third embodiment is the same as that of the flight control system illustrated in FIG. 1. The configuration of a controller 20, the VO terminals 21, and the drone 30 according to the third embodiment is the same as that of the controller 20, the VO terminals 21, and the drone 30 illustrated in FIGS. 3, 4, and 5.

The notification device 10 illustrated in FIG. 18 includes the communication unit 101, the control unit 102, and the storage unit 103. The same components as those of the notification device 10 according to the first or second embodiment are given the same reference numerals, and description thereof is omitted.

The control unit 102 is a CPU, for example, and controls the operation of the notification device 10. The control unit 102 includes the central control section 111, the responsible observer determination section 112, the notification information generation section 113, the notification control section 114, the notification timing determination section 115, the responsible observation period calculation section 116, and an incoming direction determination section 117.

The incoming direction determination section 117 identifies, on the basis of a flight route and positions of the terminals (the controller 20 and the VO terminals 21) carried by the plurality of responsible observer candidates (the operator 1 and the VOs 2, 3, and 4), directions in which the drone 30 is coming into responsible observation areas. The notification control section 114 notifies the terminals (the controller 20 and the VO terminals 21) carried by the plurality of responsible observer candidates (the operator 1 and the VOs 2, 3, and 4) of the incoming directions.

Figure 19:
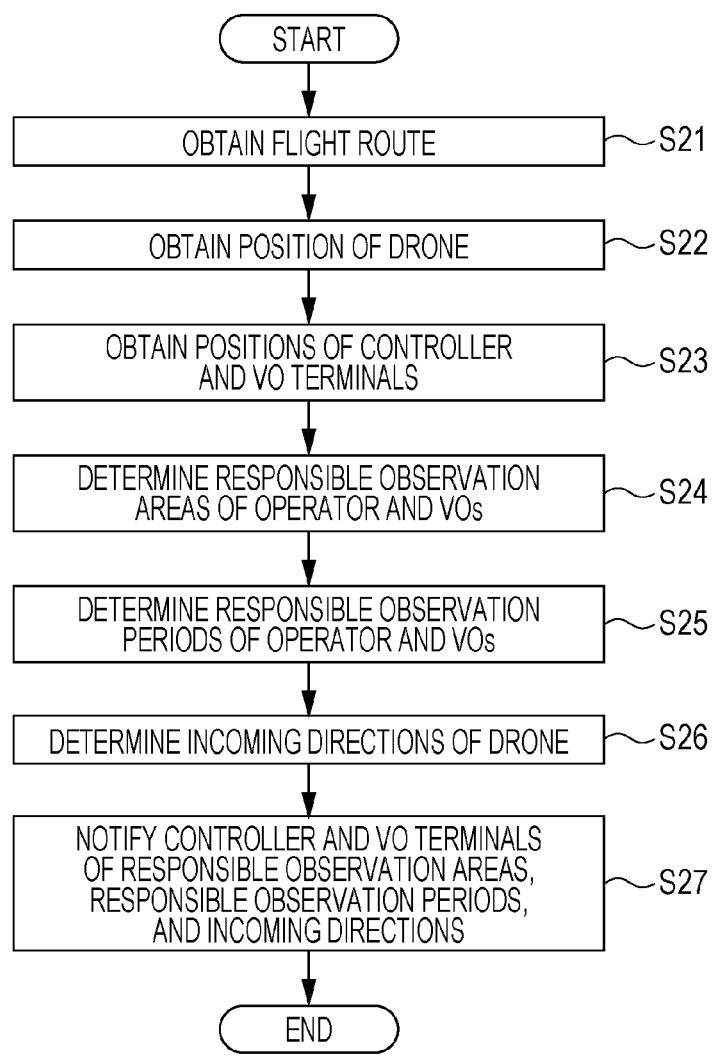
FIG. 19 is a flowchart illustrating the operation of the notification device according to the third embodiment of the present disclosure.

FIG. 19 is a flowchart illustrating the operation of the notification device 10 according to the third embodiment of the present disclosure.

Steps S21 to S25 are the same as steps S11 to S15, respectively, illustrated in FIG. 11, and description thereof is omitted.

Next, in step S26, the incoming direction determination section 117 identifies directions in which the drone 30 is coming into the responsible observation areas. The incoming directions are represented by points of the compass. More specifically, the incoming direction determination section 117 determines, on the basis of positions of the terminals carried by the responsible observers at a time when the drone 30 is coming into the corresponding responsible observation areas, points of the compass at a time when the drone 30 is coming into the responsible observation areas as the incoming directions.

If a terminal is notified of a responsible observation area, a responsible observation period, and an incoming direction when the drone 30 is entering the responsible observation area, the incoming direction determination section 117 may determine a direction of a current position of the drone 30 relative to a current position of the terminal carried by a responsible observer as the incoming direction. If a terminal is notified of a responsible observation area, a responsible observation period, and an incoming direction before the drone 30 enters the responsible observation area, the incoming direction determination section 117 may determine, on the basis of a current position of the terminal carried by a responsible observer, a direction of a position of the drone 30 at a time when the drone 30 enters the responsible observation area based on a flight route as the incoming direction.

Next, in step S27, the notification control section 114 notifies the controller 20 and the VO terminals 21 carried by the operator 1 and the VOs 2, 3, and 4 of the responsible observation areas, the responsible observation periods, and the incoming directions. More specifically, the notification information generation section 113 generates notification information for notifying the operator 1 and the VOs 2, 3, and 4 of the responsible observation areas determined by the responsible observer determination section 112, the responsible observation periods determined by the responsible observation period calculation section 116, and the incoming directions determined by the incoming direction determination section 117. At this time, the notification information generation section 113 may include the flight route information 127 in the notification information. The notification control section 114 transmits the generated notification information to the controller 20 and the VO terminals 21 through the communication unit 101.

The communication units 203 of the controller 20 and the VO terminals 21 receive the notification information transmitted from the notification device 10. The control units 201 display the responsible observation areas, the responsible observation periods, and the incoming directions on the display units 206 on the basis of the received notification information.

The operation of the notification device 10 illustrated in FIG. 19 may start when the drone 30 starts to fly or when the notification device 10 has received a flight route. Alternatively, the operation of the notification device 10 illustrated in FIG. 19 may be performed regularly.

A timing at which the controller 20 and the VO terminals 21 carried by the operator 1 and the VOs 2, 3, and 4 are notified of responsible observation areas, responsible observation periods, and incoming directions is the same as that described in the second embodiment.

In addition, in the third embodiment, the notification device 10 may notify the controller 20 and the VO terminals 21 of altitudes of the drone 30 at a time when the drone 30 enters responsible observation areas, as well as directions in which the drone 30 is coming. If there is a certain building such as a public facility in an incoming direction, or if there is a building whose height is equal to or larger than a certain value in an incoming direction, for example, the notification device 10 may transmit information regarding the building.

Figure 20:
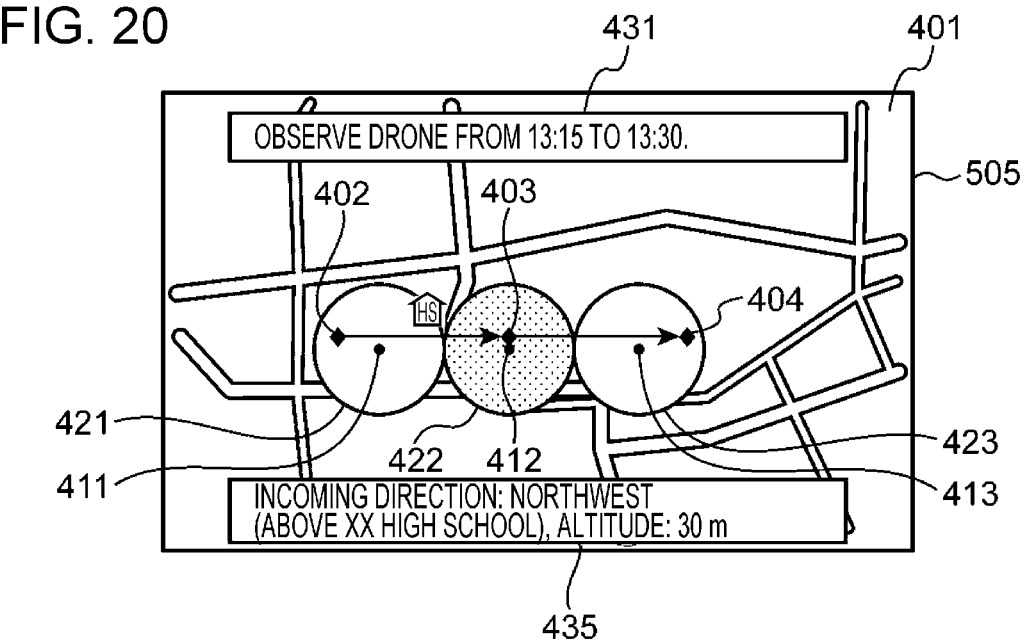
FIG. 20 is a diagram illustrating an example of a display screen displayed on one of display units of a controller and VO terminals according to the third embodiment of the present disclosure.

FIG. 20 is a diagram illustrating an example of a display screen displayed on one of the display units 206 of the controller 20 and the VO terminals 21 according to the third embodiment of the present disclosure. In a display screen 505 illustrated in FIG. 20, the same elements as those included in the display screen 501 illustrated in FIG. 12 are given the same reference numerals, and description thereof is omitted.

In the display screen 505 illustrated in FIG. 20, the message 431 indicating a responsible observation period and a message 435 indicating an incoming direction are displayed. The responsible observation period includes an observation start time and an observation end time. If the observation start time is 13:15 and the observation end time is 13:30, for example, the message 431 says, "Observe drone from 13:15 to 13:30". In addition, if the incoming direction is northwest (above XX High School) and the altitude of the drone 30 is 30 m, for example, the message 435 says, "Incoming direction: northwest (above XX High School), Altitude: 30 m".

Since a terminal is notified of a direction in which the drone 30 is coming into a responsible observation area, a responsible observer can easily find the drone 30.

In addition, since a terminal is notified of, in addition to an incoming direction, the altitude of the drone 30 at a time when the drone 30 enters a responsible observation area or information regarding a building located in the incoming direction, a responsible observer can find the drone 30 more easily.

Fourth Embodiment

Next, a flight control system according to a fourth embodiment will be described.

In the fourth embodiment, a drone 30 does not fly along a flight route but is subjected to arbitrary remote control performed by the operator 1. If responsible observation areas of a plurality of responsible observer candidates overlap, the plurality of responsible observer candidates need to visually observe the drone 30 in turn. In the fourth embodiment, therefore, if responsible observation areas overlap, a notification device 10 notifies the terminals carried by the plurality of responsible observer candidates of order in which the plurality of responsible observer candidates are to visually observe the drone 30 and responsible observation periods, for which the plurality of responsible observer candidates are to visually observe the drone 30 as responsible observers.

Figure 21:
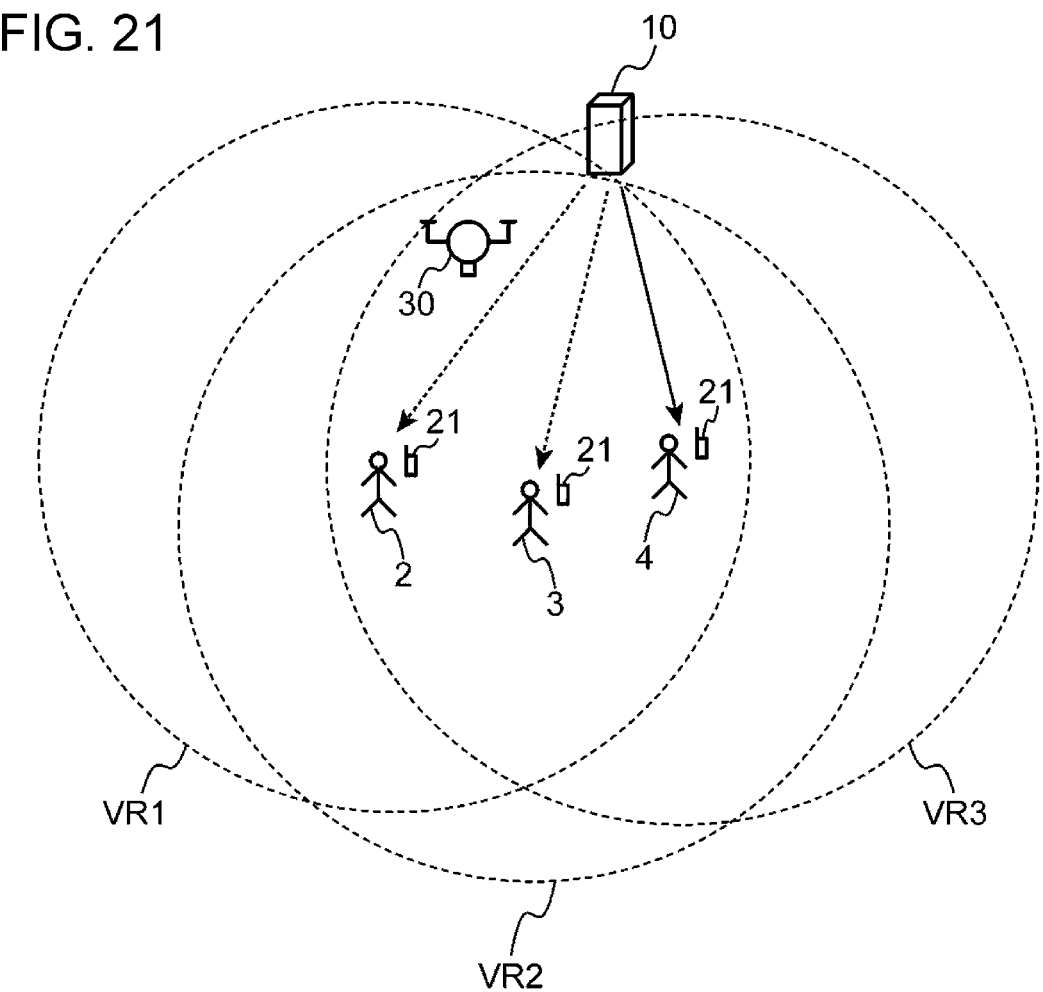
FIG. 21 is a schematic diagram illustrating responsible observation areas according to a fourth embodiment of the present disclosure.

FIG. 21 is a schematic diagram illustrating responsible observation areas according to the fourth embodiment of the present disclosure.

As illustrated in FIG. 21, the sizes of the observable areas VR1, VR2, and VR3 of the VOs 2, 3, and 4 are determined in advance. The observable areas VR1, VR2, and VR3 are responsible observation areas of the VOs 2, 3, and 4, respectively. The responsible observation areas of the VOs 2, 3, and 4 overlap. The notification device 10 determines the order in which the VOs 2, 3, 4 are to visually observe the drone 30 and the responsible observation periods, for which the VOs 2, 3, and 4 are to visually observe the drone 30 as responsible observers, and notifies the VOs 2, 3, and 4 of the determined order and responsible observation periods.

Figure 22:
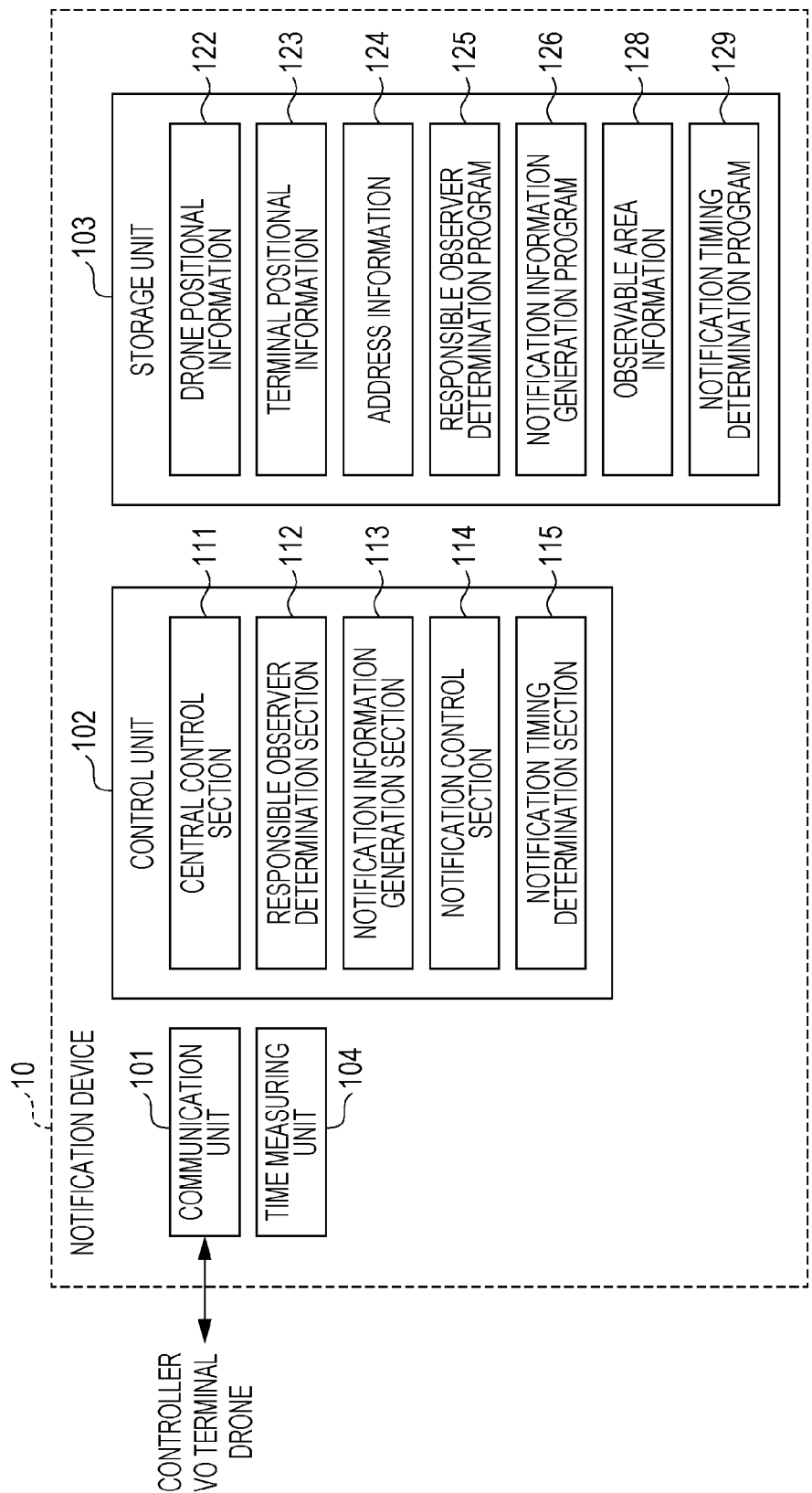
FIG. 22 is a block diagram illustrating the configuration of a notification device according to the fourth embodiment of the present disclosure.

FIG. 22 is a block diagram illustrating the configuration of the notification device 10 according to the fourth embodiment of the present disclosure. The configuration of the flight control system according to the fourth embodiment is the same as that of the flight control system illustrated in FIG. 1. The configuration of a controller 20, VO terminals 21, and the drone 30 according to the fourth embodiment is the same as that of the controller 20, the VO terminals 21, and the drone 30 illustrated in FIGS. 3, 4, and 5.

The notification device 10 illustrated in FIG. 22 includes the communication unit 101, the control unit 102, the storage unit 103, and a time measuring unit 104. The same components as those of the notification device 10 according to the first embodiment are given the same reference numerals, and description thereof is omitted.

The time measuring unit 104 measures time that has elapsed since one of the plurality of responsible observer candidates becomes a responsible observer.

The control unit 102 is a CPU, for example, and controls the operation of the notification device 10. The control unit 102 includes the central control section 111, the responsible observer determination section 112, the notification information generation section 113, the notification control section 114, and the notification timing determination section 115.

If the responsible observation areas of the plurality of responsible observer candidates overlap, the responsible observer determination section 112 determines the plurality of responsible observer candidates as responsible observers in descending order of closeness to the drone 30. The responsible observer determination section 112 also determines a certain period of time as the responsible observation periods of the plurality of responsible observer candidates.

The storage unit 103 is a semiconductor memory, for example, and stores various pieces of information. The storage unit 103 includes the drone positional information 122, the terminal positional information 123, the address information 124, the responsible observer determination program 125, the notification information generation program 126, the observable area information 128, and the notification timing determination program 129.

Figure 23:
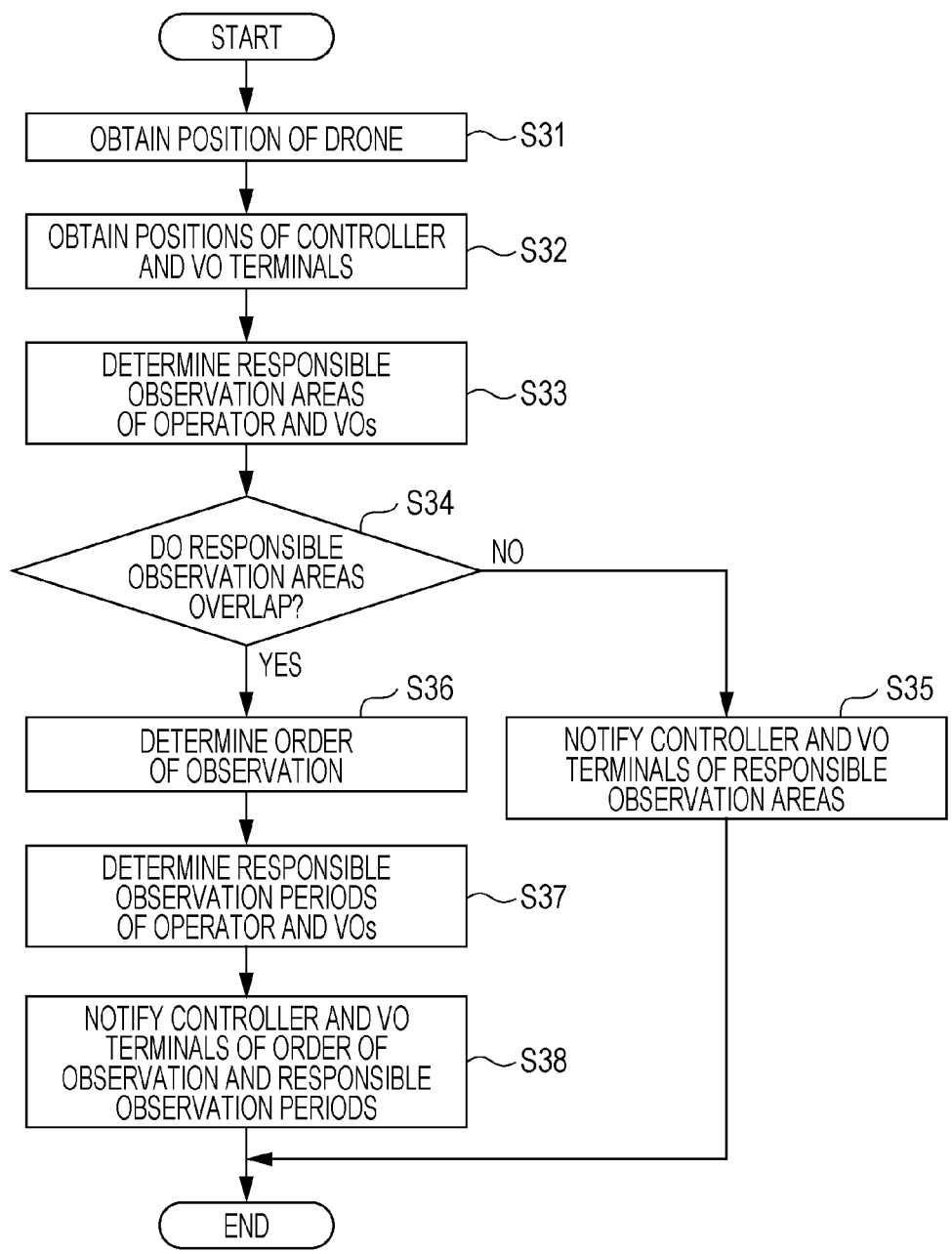
FIG. 23 is a flowchart illustrating the operation of the notification device according to the fourth embodiment of the present disclosure.

FIG. 23 is a flowchart illustrating the operation of the notification device 10 according to the fourth embodiment of the present disclosure. In the fourth embodiment, a flight route is not determined, and the operator 1 arbitrarily remotely operates the drone 30 using the controller 20.

Steps S31 to S33 are the same as steps S2 to S4, respectively, illustrated in FIG. 7, and description thereof is omitted.

Next, in step S34, the responsible observer determination section 112 determines whether some of the responsible observation areas of the operator 1 and the VOs 2, 3, and 4 overlap. If the responsible observer determination section 112 determines that the responsible observation areas do not overlap (NO in step S34), the notification control section 114, in step S35, notifies the controller 20 and the VO terminals 21 of the responsible observation areas of the operator 1 and the VOs 2, 3, and 4. More specifically, the notification information generation section 113 generates notification information for notifying the operator 1 and the VOs 2, 3, and 4 of the responsible observation areas determined by the responsible observer determination section 112. The notification control section 114 transmits the generated notification information to the controller 20 and the VO terminals 21 through the communication unit 101.

The communication units 203 of the controller 20 and the VO terminals 21 receive the notification information transmitted from the notification device 10. The control units 201 display the responsible observation areas on the display units 206 on the basis of the received notification information.

If determining that responsible observation areas overlap (YES in step S34), on the other hand, the responsible observer determination section 112, in step S36, determines the plurality of responsible observer candidates (the operator 1 and the VOs 2, 3, and 4) whose responsible observation areas overlap as responsible observers in descending order of closeness to the drone 30. More specifically, the responsible observer determination section 112 calculates distances between the terminals carried by the operator 1 and the VOs 2, 3, and 4 whose responsible observation areas overlap and the drone 30. The responsible observer determination section 112 then determines the operator 1 and the VOs 2, 3, and 4 as responsible observers in ascending order of the distance between the terminal and the drone 30.

Next, in step S37, the responsible observer determination section 112 determines a certain period of time as responsible observation periods of the operator 1 and the VOs 2, 3, and 4. The certain period of time may be stored in the storage unit 103 in advance, or may be input by the user.

Next, in step S38, the notification control section 114 notifies the controller 20 and the VO terminals 21 carried by the operator 1 and the VOs 2, 3, and 4 of the order of observation and the responsible observation periods. More specifically, the notification information generation section 113 generates notification information for notifying the operator 1 and the VOs 2, 3, and 4 of the order of observation and the responsible observation periods determined by the responsible observer determination section 112. The notification control section 114 transmits the generated notification information to the controller 20 and the VO terminals 21 through the communication unit 101.

The communication units 203 of the controller 20 and the VO terminals 21 receive the notification information transmitted from the notification device 10. The control units 201 display the order of observation and the responsible observation periods on the display units 206 on the basis of the received notification information.

The operation of the notification device 10 illustrated in FIG. 23 may start when the drone 30 starts to fly. Alternatively, the operation of the notification device 10 illustrated in FIG. 23 may be regularly performed.

Figures 24, 25:
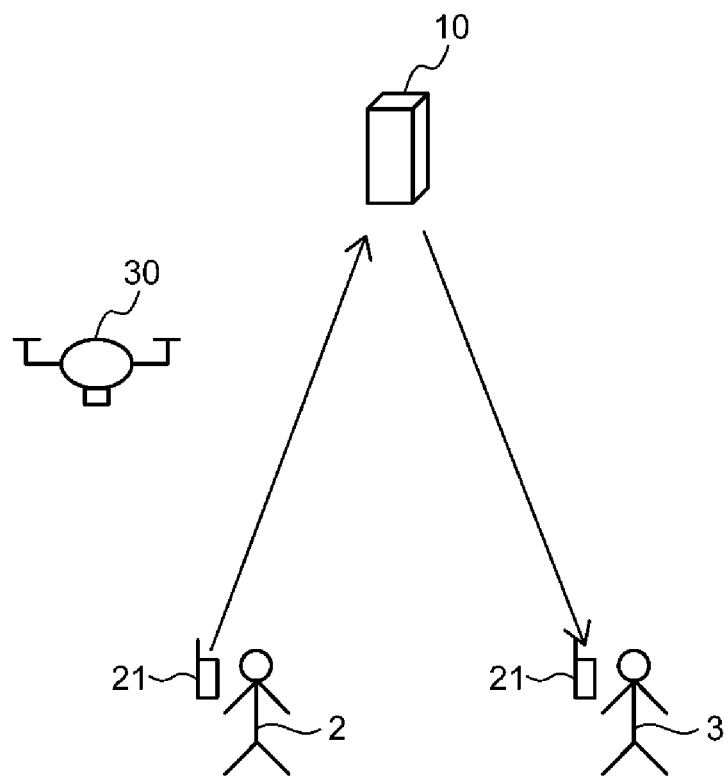
FIG. 24 is a diagram illustrating an example of a display screen displayed on one of display units of a controller and VO terminals according to the fourth embodiment of the present disclosure.
FIG. 25 is a schematic diagram illustrating a flight control system according to a fifth embodiment of the present disclosure.

FIG. 24 is a diagram illustrating an example of a display screen displayed on one of the display units 206 of the controller 20 and the VO terminals 21 according to the fourth embodiment of the present disclosure.

In the display screen 506 illustrated in FIG. 24, names of the responsible observers and the responsible observation periods of the responsible observers are displayed. If the operator 1, a first VO 2, a second VO 3, a third VO 4, and the operator 1 are to visually observe the drone 30 in this order, for example, the operator 1, the first VO 2, the second VO 3, the third VO 4, and the operator 1 are displayed in this order from the top. In addition, in the display screen 506, the responsible observation areas of the responsible observers are displayed beside the names of the responsible observers. In addition, in order to make it easier to identify the responsible observation period of each responsible observer, a certain mark (a star mark in FIG. 24) is displayed near the name of the responsible observer. Because the display screen 506 illustrated in FIG. 24 is used to notify the second VO 3 of the order of observation and the responsible observation period, the certain mark is displayed near the second VO 3.

The plurality of responsible observer candidates are notified of the display screen 506 when the drone 30 starts to fly. The time measuring unit 104 measures time that has elapsed since each responsible observer candidate becomes a responsible observer, and after it is determined, on the basis of the time measured by the time measuring unit 104, that a corresponding responsible observation period has ended, the notification control section 114 may notify the terminal carried by a next responsible observer that the responsible observer has changed.

In addition, if a distance between the drone 30 and the terminal carried by one of the plurality of responsible observer candidates other than the current responsible observer becomes equal to or smaller than a certain value, the responsible observer determination section 112 may determine the responsible observer candidate as the responsible observer. That is, the responsible observer determination section 112 regularly obtains the current positions of the drone 30, the controller 20, and the VO terminals 21 and determine whether a distance between the drone 30 and the controller 20 or a VO terminal 21 has become equal to or smaller than the certain value. If determining that the distance between the drone 30 and the controller 20 or the VO terminal 21 has become equal to or smaller than the certain value, the responsible observer determination section 112 may determine the operator 1 or a VO who carries the controller 20 or the VO terminal 21 as a new responsible observer.

In addition, the responsible observer determination section 112 may store the positions of the controller 20 and the VO terminals 21 at a time when the order of observation and the responsible observation periods have been determined. The responsible observer determination section 112 may regularly obtain the current positions of the controller 20 and the VO terminals 21 and, if a distance between the obtained current position of the controller 20 or a VO terminal 21 and the stored position of the controller 20 or the VO terminal 21 becomes equal to or higher than a certain value, determine the order of observation and the responsible observation periods again.

In addition, the storage unit 103 of the notification device 10 may store a flight history of the drone 30. The responsible observer determination section 112 may estimate a direction in which the drone 30 moves on the basis of the flight history of the drone 30 and determine the plurality of responsible observer candidates as responsible observers in descending order of closeness to the estimated direction. If the operator 1 is flying the drone 30 to a certain destination included in the flight history, the flight direction of the drone 30 can be estimated, and responsible observers can be determined in accordance with the estimated flight direction of the drone 30.

In addition, in the fourth embodiment, the responsible observer determination section 112 may ask, in descending order of closeness to the drone 30, the plurality of responsible observer candidates (the operator 1 and the VOs 2, 3, and 4) whose responsible observation areas overlap whether to accept to visually observe the drone 30 as a responsible observer. The responsible observer determination section 112 may then determine, as a responsible observer, a first responsible observer candidate who has accepted to visually observe the drone 30 as a responsible observer.

In addition, in the fourth embodiment, the responsible observer determination section 112 may determine the plurality of responsible observer candidates (the operator 1 and the VOs 2, 3, and 4) whose responsible observation areas overlap as responsible observers in descending order of altitude.

In addition, in the fourth embodiment, the responsible observer determination section 112 may determine the plurality of responsible observer candidates (the operator 1 and the VOs 2, 3, and 4) whose responsible observation areas overlap as responsible observers while giving priority to those without a building whose height is equal to or larger than a certain value in a direction of the drone 30. In this case, the responsible observer determination section 112 identifies the direction of the drone 30 on the basis of the current position of the drone 30 and the current positions of the terminals carried by the plurality of responsible observer candidates and extracts buildings whose heights are equal to or larger than the certain value in the identified direction.

In addition, in the fourth embodiment, a responsible observer candidate determined as a responsible observer may designate, from among the other responsible observer candidates, another responsible observer candidate who serves as a responsible observer on behalf of him/herself.

Fifth Embodiment

Next, a flight control system according to a fifth embodiment will be described.

FIG. 25 is a schematic diagram illustrating a flight control system according to a fifth embodiment of the present disclosure.

If it becomes difficult for the first VO 2 who is closest to a drone 30 to visually observe the drone 30 as a responsible observer while visually observing the drone 30, for example, the first VO 2 requests a notification device 10 to change the responsible observer. Upon receiving the request from the first VO 2, the notification device 10 changes the responsible observer from the first VO 2 to the second VO 3 and notifies the VO terminal 21 carried by the second VO 3 that the second VO 3 has been determined as the responsible observer. At this time, if the notification device 10 does not notify the second VO 3 of a reason why the responsible observer has been changed, the second VO 3 might think that he/she has been determined as the responsible observer although there is the first VO 2 who is closest to the drone 30, and request the notification device 10 to change the responsible observer again. In the fifth embodiment, therefore, a responsible observer candidate who has been determined as a responsible observer is notified, when the responsible observer candidate is notified that he/she has been determined as the responsible observer, of a reason why the responsible observer candidate has been determined as the responsible observer.

Figure 26:
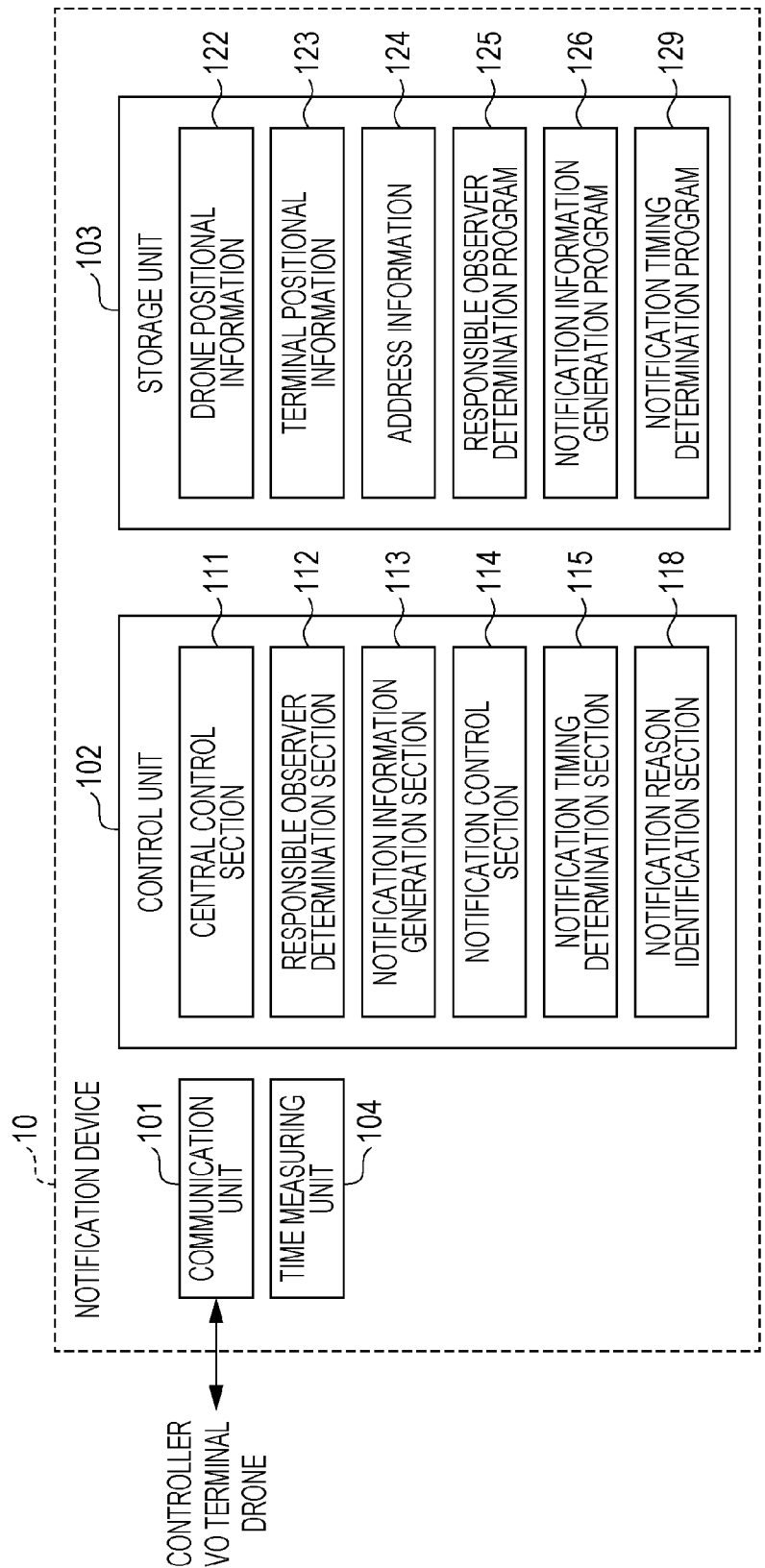
FIG. 26 is a block diagram illustrating the configuration of a notification device according to the fifth embodiment of the present disclosure.

FIG. 26 is a block diagram illustrating the configuration of the notification device 10 according to the fifth embodiment of the present disclosure. The configuration of the flight control system according to the fifth embodiment is the same as that of the flight control system illustrated in FIG. 1. The configuration of a controller 20, VO terminals 21, and the drone 30 according to the fifth embodiment is the same as that of the controller 20, the VO terminals 21, and the drone 30 illustrated in FIGS. 3, 4, and 5.

The notification device 10 illustrated in FIG. 26 includes the communication unit 101, the control unit 102, the storage unit 103, and the time measuring unit 104. The same components as those of the notification device 10 according to the fourth embodiment are given the same reference numerals, and description thereof is omitted.

The control unit 102 is a CPU, for example, and controls the operation of the notification device 10. The control unit 102 includes the central control section 111, the responsible observer determination section 112, the notification information generation section 113, the notification control section 114, the notification timing determination section 115, and a notification reason identification section 118.

The communication unit 101 receives refusal information for refusing to visually observe the drone 30 as a responsible observer from at least one of a plurality of terminals notified of at least either a responsible observation area or a responsible observation period.

The responsible observer determination section 112 determines, as a new responsible observer, a responsible observer candidate who carries a terminal second closest to the drone 30 instead of a responsible observer candidate who carries a terminal closest to the drone 30 and who has refused visual observation.

The notification reason identification section 118 identifies a reason why a new responsible observer has been determined. If refusal information is received, for example, the notification reason identification section 118 determines, as a notification reason, the refusal from a responsible observer candidate who has been determined as a responsible observer.

The notification control section 114 notifies a terminal carried by a responsible observer candidate determined as a new responsible observer that he/she has been determined as the responsible observer, as well as a reason why he/she has been determined as the new responsible observer.

Figure 27:
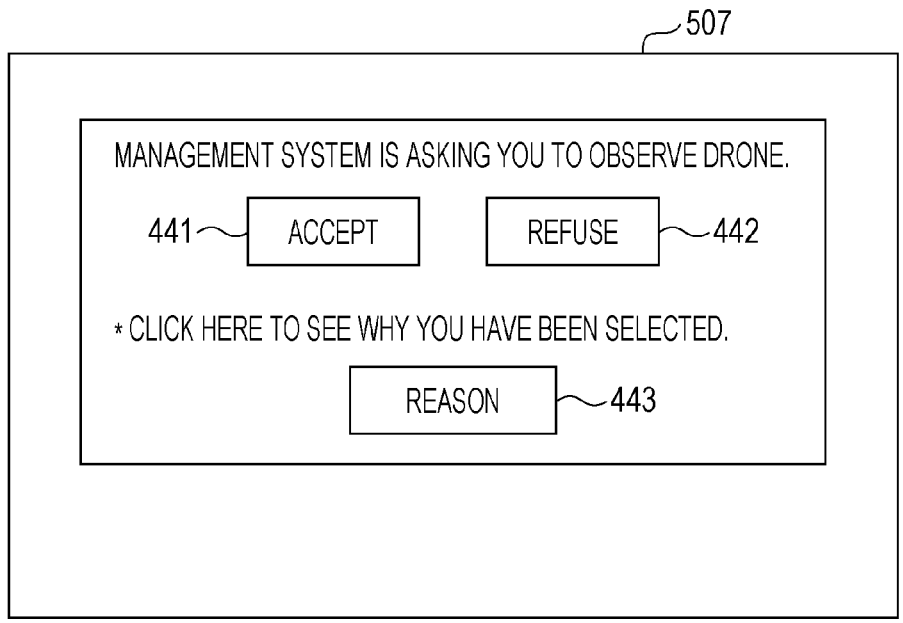
FIG. 27 is a diagram illustrating an example of a display screen displayed on one of display units of a controller and VO terminals when a responsible observer is to be changed according to the fifth embodiment of the present disclosure.

FIG. 27 is a diagram illustrating an example of a display screen displayed on one of the display units 206 of the controller 20 and the VO terminals 21 when a responsible observer is to be changed according to the fifth embodiment of the present disclosure.

Each time the notification device 10 changes a responsible observer, the notification device 10 asks a responsible observer candidate who has been determined as the new responsible observer whether to accept to become the responsible observer.

In a display screen 507 illustrated in FIG. 27, an accept button 441 for accepting to become a responsible observer, a refuse button 442 for refusing to become a responsible observer, and a reason button 443 for displaying a reason why a responsible observer candidate has been selected as a responsible observer. The user input units 205 of the controller 20 and the VO terminals 21 include touch panels.

If the accept button 441 is tapped, the communication unit 203 transmits, to the notification device 10, information for accepting to become a new responsible observer. If the refuse button 442 is tapped, the communication unit 203 transmits, to the notification device 10, information for refusing to become a new responsible observer.

If the reason button 443 is tapped, the control unit 201 displays, on the display unit 206, a reason why a responsible observer candidate has been selected as a new responsible observer.

Figure 28:
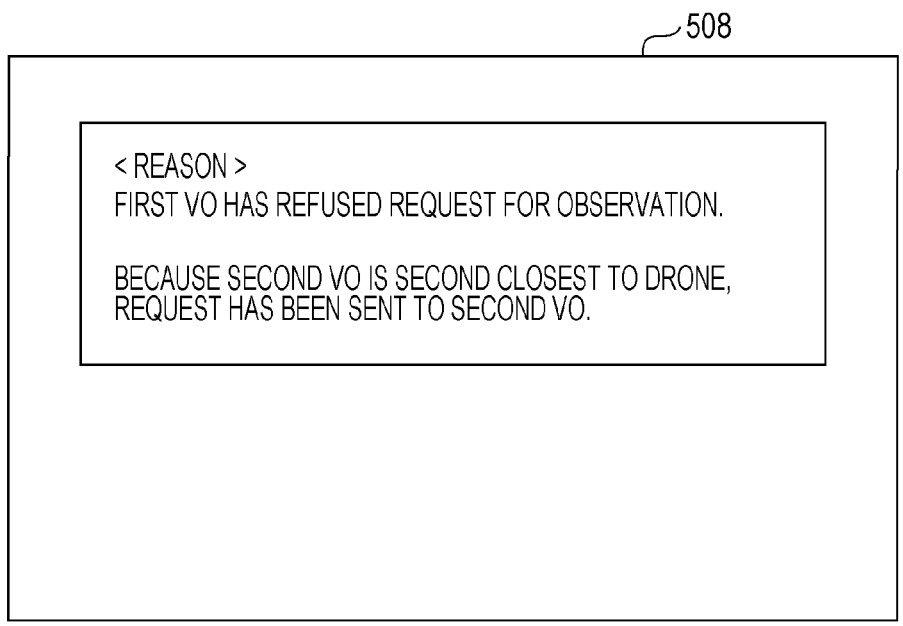
FIG. 28 is a diagram illustrating an example of a display screen indicating a reason why a responsible observer candidate has been selected as a new responsible observer according to the fifth embodiment of the present disclosure.

FIG. 28 is a diagram illustrating an example of a display screen indicating a reason why a responsible observer candidate has been selected as a new responsible observer according to the fifth embodiment of the present disclosure.

If the reason button 443 is tapped, a display screen 508 illustrated in FIG. 28 is displayed. The display screen 508 indicates a reason why a responsible observer candidate has been determined as a new responsible observer. In the example illustrated in FIG. 28, it is indicated that because the first VO 2, who is closest to the drone 30, has refused to visually observe the drone 30, the second VO 3, who is second closest to the drone 30, has been selected as a responsible observer.

Since a terminal carried by a responsible observer candidate who has been determined as a new responsible observer is notified that he/she has been determined as the responsible observer, as well as a reason why he/she has been determined as the new responsible observer, the responsible observer candidate can understand why he/she has been determined as the new responsible observer. The responsible observer candidate can then determine whether to accept to become the new responsible observer in consideration of the reason why he/she has been determined as the new responsible observer.

In the fifth embodiment, the notification device 10 may receive, from a terminal carried by a responsible observer, a request to change the responsible observer while the responsible observer is visually observing the drone 30. If a request to change the responsible observer is received from the current responsible observer, the responsible observer determination section 112 may determine, among the other responsible observer candidates, one who is second closest to the drone 30 as the new responsible observer. In this case, the notification control section 114 may notify a terminal carried by the responsible observer candidate who has been determined as the new responsible observer that he/she has been determined as the new responsible observer, as well as a reason why he/she has been determined as the new responsible observer.

In addition, in the fifth embodiment, if there is a building between the drone 30 and a responsible observer, the responsible observer determination section 112 may determine, among the other responsible observer candidates, one who is second closest to the drone 30 as a new responsible observer. In this case, the notification control section 114 may notify a terminal carried by the responsible observer candidate who has been determined as the new responsible observer that he/she has been determined as the new responsible observer, as well as a reason why he/she has been determined as the new responsible observer.

Other Embodiments

The first to fifth embodiments have been described above as examples of the techniques disclosed in the present disclosure. The techniques disclosed in the present disclosure, however, are not limited to these embodiments, and can also be applied to embodiments obtained by performing modification, replacement, addition, omission, or the like on the above embodiments. In addition, new embodiments may be obtained by combining together components described in the first to fifth embodiments.

In addition, in the first to fifth embodiments, a responsible observer candidate may be asked whether to visually observe the drone 30 as a responsible observer when a terminal carried by the responsible observer candidate is notified of at least either a responsible observation area or a responsible observation period. If the responsible observer candidate refuses to become the responsible observer, the responsible observer determination section 112 may newly determine the responsible observer among other responsible observer candidates. If a certain period of time elapses without a response for accepting to become the responsible observer, the responsible observer determination section 112 may newly determine the responsible observer among the other responsible observer candidates. In this case, the notification control section 114 may notify a terminal carried by a responsible observer candidate who has been determined as the new responsible observer that he/she has been determined as the new responsible observer, as well as a reason why he/she has been determined as the new responsible observer. If there is no new responsible observer, the notification control section 114 may notify the controller 20 that there is no new responsible observer.

In addition, in the first to fifth embodiments, if a terminal carried by a VO is notified of at least either a responsible observation area or a responsible observation period, information for identifying the VO determined as a responsible observer may be transmitted to the controller 20 carried by the operator 1.

In addition, although a plurality of responsible observer candidates visually observe a single drone 30 in the first to fifth embodiments, a plurality of responsible observer candidates may visually observe a plurality of drones 30, instead. In this case, a responsible observation area and a responsible observation period are determined for each of the plurality of drones 30.

In addition, in the first to fifth embodiments, the control unit 201, the storage unit 202, and the communication unit 203 of the controller 20 may have the functions of the control unit 102, the storage unit 103, and the communication unit 101, respectively, of the notification device 10, instead.

The notification method, the notification device, and the terminal in the present disclosure are capable of notifying an operator and one or more VOs of timings at which a drone is to be visually observed, and are effective as a notification method, a notification device, and a terminal that notify a person of a timing at which a drone is to be visually observed.

What is claimed is:

1. A notification method of a timing at which a drone is to be visually observed comprising:
    obtaining, at a notification device having a processor and a memory, drone positional information transmitted from the drone to the notification device;
    obtaining, at the notification device, remote terminal positional information transmitted from a plurality of remote terminals to the notification device, each terminal of the plurality of remote terminals to be held by an operator who visually observes and operates the drone and one or more visual observers who visually observe the drone;
    determining, by the notification device, on the basis of the drone positional information and the remote terminal positional information, at least either responsible observation areas, which are areas in which the operator and the one or more visual observers are to visually observe the drone, or responsible observation periods, which are periods for which the operator and the one or more visual observers are to visually observe the drone; and
    notifying the plurality of remote terminals of at least either the responsible observation areas or the responsible observation periods determined in the determining, by transmitting data corresponding to the at least either the responsible observation areas or the responsible observation periods.

2. The notification method according to claim 1,
    wherein, in the determining, at least either the responsible observation areas or the responsible observation periods are determined on the basis of the drone positional information, the remote terminal positional information, and a flight route of the drone, and
    wherein, in the notifying, the plurality of remote terminals are notified of at least either the responsible observation areas or the responsible observation periods and the flight route.

3. The notification method according to claim 2,
    wherein the determining further comprises calculating and determining by the notification device flight periods, each of which is time taken for the drone to pass through a corresponding one of the responsible observation areas along the flight route, as the responsible observation periods.

4. The notification method according to claim 2,
    wherein the determining further comprises calculating and determining by the notification device observation start times, each of which is a time at which the drone enters a corresponding one of the responsible observation areas along the flight route, as the responsible observation periods.

5. The notification method according to claim 4,
    further comprising performing the notifying is performed within a certain period of time before each of the responsible observation periods.

6. The notification method according to claim 2,
    wherein the determining further comprises calculating and determining by the notification device, if the drone passes through the responsible observation areas along the flight route at least twice each:
        first responsible observation start times, at each of which the drone enters a corresponding one of the responsible observation areas along the flight route, as first responsible observation periods, and
        second observation start times, at each of which the drone enters the corresponding one of the responsible observation areas, as second responsible observation periods, and
    wherein the notifying further comprises notifying the plurality of remote terminals of the first responsible observation periods and the second responsible observation periods.

7. The notification method according to claim 2, further comprising:
    determining by the notification device, on the basis of the remote terminal positional information and the flight route, incoming directions, in which the drone is coming into the responsible observation areas,
    wherein the notifying further comprises also notifying the plurality of remote terminals of the incoming directions.

8. The notification method according to claim 1,
    wherein the notifying further comprises notifying, if the responsible observation period of a second one of the plurality of remote terminals is changed in the responsible observation period of a first one of the plurality of remote terminals, the second remote terminal of a new responsible observation period and a reason why the responsible observation period has been changed.

9. The notification method according to claim 1,
    wherein the determining further comprises preceding, the responsible observation period of the first remote terminal, which is closer to the drone than the second remote terminal, the responsible observation period of the second remote terminal, if the responsible observation areas of a first one and a second one of the plurality of remote terminals overlap.

10. The notification method according to claim 9,
    further comprising regularly performing the obtaining of the drone positional information and the obtaining of the remote terminal positional information, and
    wherein the determining further comprises determining, if a distance between the drone and a third one of the plurality of remote terminals becomes equal to or smaller than a certain value, a present time as the responsible observation period of the remote third terminal.

11. The notification method according to claim 9, wherein if refusal information for refusing to visually observe the drone is received from the first remote terminal:

in the determining, determining a present time as the responsible observation period of the second remote terminal, and in the notifying, notifying the second remote terminal of the responsible observation period and a reason why the present time has been determined as the responsible observation period of the second remote terminal.

12. A notification device comprising:

storage that stores drone positional information transmitted from a drone and remote terminal positional information transmitted from a plurality of remote terminals, each terminal of the plurality of remote terminals to be held by an operator who visually observes and operates the drone and one or more visual observers who visually observe the drone; and circuitry that, in operation, performs operations including determining, on the basis of the drone positional information and the remote terminal positional information, at least either responsible observation areas, which are areas in which the operator and the one or more visual observers are to visually observe the drone, or responsible observation periods, which are periods for which the operator and the one or more visual observers are to visually observe the drone, and notifying the plurality of remote terminals of at least either the responsible observation areas or the responsible observation periods.

13. A remote terminal comprising:

a communicator that receives at least either responsible observation areas, which are areas in which an operator who visually observes and operates a drone and one or more visual observers who visually observe the drone are to visually observe the drone, or responsible observation periods, which are periods for which the operator and the one or more visual observers are to visually observe the drone; and a display that displays at least either the responsible observation areas or the responsible observation periods received from the communicator.

\* \* \* \* \*